(12) United States Patent
Rudolph

(10) Patent No.: US 10,812,183 B2
(45) Date of Patent: Oct. 20, 2020

(54) MITIGATING POLARIZATION DEPENDENT LOSS (PDL) BY TRANSFORMING FREQUENCY COMPONENTS TO A BALL

(71) Applicant: VIAVI SOLUTIONS INC., San Jose, CA (US)

(72) Inventor: Georg Rudolph, Tübingen (DE)

(73) Assignee: VIAVI SOLUTIONS INC., San Jose, CA (US)

( * ) Notice: Subject to any disclaimer, the term of this patent is extended or adjusted under 35 U.S.C. 154(b) by 0 days.

(21) Appl. No.: 16/277,592

(22) Filed: Feb. 15, 2019

(65) Prior Publication Data

US 2020/0266887 A1 Aug. 20, 2020

(51) Int. Cl.
| | | |
|---|---|---|
| *H04B 10/07* | (2013.01) | |
| *H04B 10/079* | (2013.01) | |
| *H04J 14/06* | (2006.01) | |
| *H04B 10/60* | (2013.01) | |

(52) U.S. Cl.
CPC . *H04B 10/07953* (2013.01); *H04B 10/07955* (2013.01); *H04J 14/06* (2013.01); *H04B 10/07* (2013.01); *H04B 10/60* (2013.01)

(58) Field of Classification Search
CPC ........ H04B 10/07953; H04B 10/07955; H04B 10/60; H04B 10/07; H04J 14/06
USPC ....................................... 398/9–38, 202–214
See application file for complete search history.

(56) References Cited

U.S. PATENT DOCUMENTS

| | | | | |
|---|---|---|---|---|
| 5,327,511 A | * | 7/1994 | Heismann | G02B 6/126 385/1 |
| 5,371,597 A | * | 12/1994 | Favin | G01M 11/333 356/364 |
| 6,229,599 B1 | * | 5/2001 | Galtarossa | G01M 11/3181 356/73.1 |
| 6,671,045 B1 | * | 12/2003 | Lee | H04B 10/077 356/364 |
| 8,059,958 B1 | * | 11/2011 | Jiang | H04B 10/0795 398/28 |

(Continued)

OTHER PUBLICATIONS

Pittala et al, Joint PDL and in band OSNR Monitoring Supported by Data Aided Channel Estimation, Mar. 2012, OFC, paper OW4G.2, All Document. (Year: 2012).*

(Continued)

*Primary Examiner* — Dibson J Sanchez

(74) *Attorney, Agent, or Firm* — Mannava & Kang, P.C.

(57) ABSTRACT

An apparatus for mitigating polarization dependent loss (PDL) in an optical signal-to-noise ratio (OSNR) of a modulated optical signal is disclosed. The apparatus may comprise a spectrum analyzer to measure an optical power spectrum of a modulated optical signal. The apparatus may also comprise a measuring unit to select a first portion of the modulated optical signal and a second portion of the modulated optical signal, where each of the first and second portions of the modulated optical signals may include an independent noise distribution indicative of PDL, and measure a time-varying parameter of the first and second portions. The apparatus may also include a signal processor to PDL in an OSNR by transforming any elliptical polarization associated with the independent noise distribution into a ball polarization, determining a correlation between time-varying parameters of the first and second portions, and calculating a PDL mitigated OSNR.

20 Claims, 19 Drawing Sheets

(56) References Cited

U.S. PATENT DOCUMENTS

| | | | | |
|---|---|---|---|---|
| 8,405,511 | B2* | 3/2013 | Takeshita | H04B 10/07953 340/600 |
| 9,768,876 | B1* | 9/2017 | Hutchinson | H04B 10/532 |
| 10,389,437 | B2* | 8/2019 | Yoshida | H04J 14/08 |
| 2002/0044322 | A1* | 4/2002 | Blumenthal | H04J 14/0298 398/147 |
| 2003/0160951 | A1* | 8/2003 | Babin | G01M 11/337 356/73.1 |
| 2004/0067057 | A1* | 4/2004 | Akiyama | H04B 10/077 398/26 |
| 2004/0213338 | A1* | 10/2004 | Strawczynski | H04B 10/077 375/224 |
| 2006/0115199 | A1* | 6/2006 | Yao | G01M 11/337 385/11 |
| 2008/0124076 | A1* | 5/2008 | Rudolph | H04B 10/07953 398/26 |
| 2009/0141274 | A1* | 6/2009 | Szafraniec | G01M 11/337 356/364 |
| 2009/0316153 | A1* | 12/2009 | Heismann | H04B 10/07953 356/364 |
| 2010/0129074 | A1* | 5/2010 | Gariepy | H04B 10/07953 398/26 |
| 2012/0093501 | A1* | 4/2012 | He | H04B 10/07953 398/26 |
| 2012/0170929 | A1* | 7/2012 | Xie | H04B 10/0793 398/33 |
| 2013/0028597 | A1* | 1/2013 | Ye | H04B 10/07953 398/26 |
| 2014/0226978 | A1* | 8/2014 | Flettner | H04B 10/07953 398/26 |
| 2014/0363164 | A1* | 12/2014 | Kim | H04J 14/06 398/65 |
| 2015/0110486 | A1* | 4/2015 | Sunnerud | H04J 14/06 398/26 |
| 2016/0127048 | A1* | 5/2016 | Kikuchi | H04B 10/0795 398/202 |
| 2016/0164599 | A1* | 6/2016 | Heismann | H04B 10/07955 398/26 |
| 2016/0241341 | A1* | 8/2016 | Endo | H04B 10/50 |
| 2016/0269110 | A1* | 9/2016 | Dahan | H04B 10/0793 |
| 2016/0308611 | A1* | 10/2016 | Oda | H04J 14/06 |
| 2017/0078017 | A1* | 3/2017 | Dahan | H04B 10/07953 |
| 2017/0126315 | A1* | 5/2017 | Saito | H04B 10/572 |
| 2018/0123700 | A1* | 5/2018 | Li | H04B 10/0795 |
| 2018/0337727 | A1* | 11/2018 | Yoshida | H04B 10/07951 |
| 2019/0115976 | A1* | 4/2019 | Moeller | H04B 10/07955 |
| 2019/0149231 | A1* | 5/2019 | Li | H04B 10/6162 398/26 |
| 2019/0305845 | A1* | 10/2019 | Cyr | H04B 10/07955 |

OTHER PUBLICATIONS

Wu et al, Training Symbol Assisted in Band OSNR Monitoring Technique for PDM CO OFDM System, May 2017, JLT, vol. 35 Issue 9, All Document. (Year: 2017).*

Li et al, An Accurate and Robust PDL Monitor by Digital Signal Processing in Coherent Receiver, Mar. 2018, OFC, paper M2F.6, All Document. (Year: 2018).*

* cited by examiner

MITIGATING POLARIZATION DEPENDENT LOSS (PDL) BY TRANSFORMING FREQUENCY COMPONENTS TO A BALL

RELATED APPLICATIONS

This patent application is related to U.S. application Ser. No. 15/787,515 to Heismann, entitled "Determining In-Band Optical Signal-to-Noise Ratio in Poloarization-Multiplexed Optical Signals Using Signal Correlations," filed Oct. 18, 2017, which is incorporated herein by reference in its entirety.

TECHNICAL FIELD

This patent application relates generally to telecommunications networks, and more specifically, to systems and methods for mitigating polarization dependent loss (PDL) by transforming frequency components to a ball.

BACKGROUND

Determination of optical signal-to-noise ratio and other signal quality parameters is important in telecommunications. Quality of modulated optical signals transmitted in long-distance fiberoptic communication systems is frequently characterized by optical signal-to-noise ratio (OSNR), which defines a ratio of the total optical power of the digital information signal to optical noise added to the signal by optical amplifiers. In communication systems with only a few widely-spaced wavelength-multiplexed signals, OSNR may be readily determined by spectral analysis of a transmitted noisy signal and the optical noise floor on either side of the signal spectrum.

In modern optical communication systems with dense wavelength-division multiplexing (DWDM), various transmitted optical signals are so closely spaced in optical frequency that it becomes difficult to measure optical noise floor between adjacent signal spectra. This is of a particular concern for communication systems transmitting optical signals at bit rates of 100 Gb/s over 50-GHz wide wavelength channels. In these systems, optical noise floor within the spectral bandwidth of the signal needs to be measured to determine the signal's OSNR. Such measurements are commonly referred to as in-band OSNR measurements. Furthermore, it is frequently required that these in-band OSNR measurements are performed while the communication system is in service, e.g., that the noise floor within the signal's bandwidth is determined while the optical information signal is transmitted.

Several methods have been disclosed to measure an in-band OSNR in presence of transmitted signals. For conventional single-polarized optical information signals (e.g., for 10 Gb/s NRZ-OOK signals), a polarization-nulling technique can be used, which substantially removes the polarized signal from the received noisy signal, thus revealing the floor of an unpolarized optical noise in the spectral bandwidth of the signal.

Modern optical information signals, however, are frequently composed of two mutually orthogonally polarized optical carriers at a same optical frequency. Such carriers are typically independently modulated with digital information data. This polarization multiplexing technique is frequently used in long-distance communication systems to transmit 50 Gb/s BPSK, 100 Gb/s QPSK, or 200 Gb/s 16-QAM signals over 50-GHz wide DWDM channels. In polarization-multiplexed (PM) signals, in-band OSNR cannot be determined by means of the above-referenced polarization-nulling technique because the two orthogonally polarized optical carriers cannot be simultaneously removed from the noisy optical signal without also extinguishing the optical noise.

While several methods have been proposed to measure in-band OSNR in polarization-multiplexed signals, they generally only work with optical signals of a predetermined bit-rate, modulation format, and/or signal waveform. Consequently, these conventional methods may be suitable for monitoring of in-band OSNR at certain points in a communication system, e.g., by means of built-in monitoring equipment, but may be difficult to use as a general test and measurement procedure. Furthermore, some of these methods are not suitable for determining in-band OSNR in signals substantially distorted by chromatic dispersion (CD) or polarization-mode dispersion (PMD). In addition, there is currently no solution to obtain a good maximum correlation when polarization-dependent loss (PDL) is present on the fiber link.

As a result, techniques that mitigate polarization-dependent loss (PDL) may be helpful when determining in-band OSNR in signals substantially distorted by chromatic dispersion (CD) or polarization-mode dispersion (PMD) and overcome shortcomings of conventional technologies.

BRIEF DESCRIPTION OF DRAWINGS

Features of the present disclosure are illustrated by way of example and not limited in the following Figure(s), in which like numerals indicate like elements, in which.

DETAILED DESCRIPTION

Figure 1:
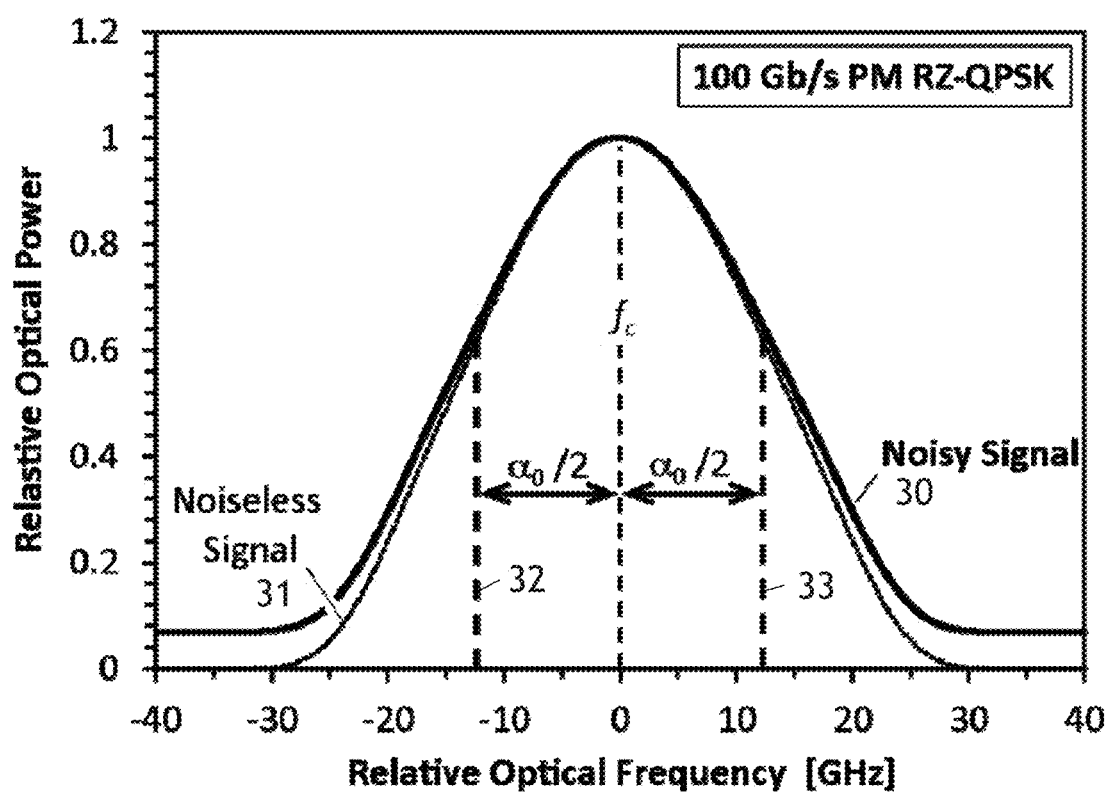
FIG. 1 illustrates a plot of an optical power spectrum of a noisy 100 Gb/s polarization-multiplexed RZ-QPSK signal, showing spectral components used for measuring the correlation coefficients at two spaced apart optical frequencies.

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

As described above, quality of modulated optical signals transmitted in long-distance fiberoptic communication systems is frequently characterized by optical signal-to-noise ratio (OSNR), which defines a ratio of the total optical power of the digital information signal to optical noise added to the signal by optical amplifiers. While several methods have been disclosed to measure in-band OSNR in polarization-multiplexed signals, they generally only work with optical signals of a predetermined bit-rate, modulation format, and/or signal waveform. Consequently, these methods may be suitable for monitoring of in-band OSNR at certain points in a communication system, e.g., by means of built-in monitoring equipment. However, these tend to be difficult to use as a general test and measurement procedure. Furthermore, some of these methods are not suitable for determining in-band OSNR in signals substantially distorted by chromatic dispersion (CD) or polarization-mode dispersion (PMD). In addition, there is currently no solution to determine a maximum correlation when polarization-dependent loss (PDL) is present on the fiber link.

By way of example, a method for in-band OSNR measurements has been proposed, but such a method generally only works with binary PSK and ASK signals. This method does not work with 100 Gb/s PM-QPSK or 200 Gb/s PM-16-QAM signals.

Other methods for in-band OSNR monitoring of polarization-multiplexed signals have been proposed but they are generally based on coherent detection with high-speed receivers and subsequent digital signal processing. These methods typically operate at a predetermined bit-rate. For example, it may be known that such methods may determines the in-band OSNR from the spread of the four polarization states through which an optical PM QPSK signal cycles rapidly. Clearly, such high-speed polarization analysis requires prior knowledge of the modulation format and the bit-rate of the transmitted signal and, furthermore, is very sensitive to signal distortions caused by chromatic dispersion (CD) and polarization mode dispersion (PMD).

For applications in long-distance communication systems, it may be advantageous to remove CD- and PMD-induced signal distortions prior to determining OSNR. Compensation of signal distortions introduced by CD and PMD may be accomplished electronically in a high-speed digital signal. Digital compensation, however, requires use of high-speed analog-to-digital convertors (ADCs), which usually have only a relatively small dynamic range (typically less than 16 dB), thus limiting the OSNR measurement range. In-band OSNR measurement methods employing error vector magnitude (EVM) analysis of the received signal after electronic compensation of CD and PMD have been proposed and used; however, EVM analysis intrinsically requires foreknowledge of the particular modulation format of the optical signal.

Another method for OSNR monitoring may be based on RF spectral analysis of low-speed intensity variations of polarization-multiplexed signals. However, this method is very sensitive to variations in signal's waveform. Hence, may require not only foreknowledge of the modulation format and bit-rate of the analyzed optical signal, but also careful calibration with a noiseless signal.

A method for in-band OSNR measurements using conventional spectral analysis of the optical signal power has been proposed as well. Unfortunately, this method appears to only work with signals whose optical spectrum is substantially narrower than the spectral width of the DWDM channel. In other words, this method typically works with 40 Gb/s PM NRZ-QPSK signals transmitted through 50-GHz wide DWDM channels, but not with 100 Gb/s PM RZ-QPSK signals transmitted through 50-GHz wide DWDM channels.

Yet another method for in-band OSNR measurements in polarization-multiplexed signals has been disclosed by W. Grupp in European Patent EP 2,393,223 "In-band SNR measurement based on spectral correlation," issued Dec. 7, 2011. Other methods for in-band OSNR measurements have been proposed that rely on determination of in-band OSNR from measurements of the cyclic autocorrelation function of the signal amplitude, which is achieved by calculating noiseless signal power from correlations between spectral components of the Fourier transform of the cyclic autocorrelation function. The cyclic autocorrelation function of the signal's amplitude may be measured, for example, by means of two parallel coherent receivers employing a common pulsed local oscillator laser. Again, this method requires foreknowledge of the modulation format and bit-rate of the optical signal, as well as careful calibration of the apparatus with a noiseless signal. In addition, the method is very sensitive to signal distortions introduced by CD and/or PMD.

In addition to these promising but ultimately deficient methods and techniques, there is currently no solution to obtain a reliable maximum correlation when polarization-dependent loss (PDL) is present on the fiber link. As a result, techniques that mitigate polarization-dependent loss (PDL) when determining in-band OSNR in signals substantially distorted by chromatic dispersion (CD) or polarization-mode dispersion (PMD) are disclosed herein.

Amplitude and phase of digitally modulated optical signals, such as QPSK- and 16-QAM-modulated signals, may vary pseudo-randomly with time. These pseudo-random amplitude and phase variations may be difficult to distinguish from random amplitude and phase variations of optical ASE noise generated by optical amplifiers, in particular if the waveform of the modulated signal is substantially distorted by large amounts of chromatic dispersion or polarization-mode dispersion in the fiber link. However, an autocorrelation function of digitally modulated signals may be periodic in time, because the transmitted symbols are assigned predetermined and substantially equal time intervals, whereas the autocorrelation function of random ASE noise does not exhibit such periodicity. The periodicity of the autocorrelation function of digitally modulated signals may be manifested in a signal's optical frequency spectrum, which may exhibit strong correlations between time-varying amplitudes, and also between time-varying intensities and optical power levels, of certain pairs of spaced apart spectral components, whereas such correlations may not exist in the optical spectrum of random ASE noise. It may be possible, therefore, to determine a relative amount of random ASE noise in a transmitted modulated signal by measuring correlations between the aforementioned spaced apart spectral components, and by subsequently comparing the measured correlations to corresponding correlations in a noiseless signal spectrum. Once the relative amount of ASE noise in a transmitted signal is determined, the in-band OSNR of the noisy signal may be calculated.

Correlations between various spectral components of a digitally modulated signal may be described by a spectral correlation density function (SCDF), $S_x^\alpha(f)$, which may be defined as the Fourier transformation of the cyclic autocorrelation function, $R_x^\alpha(\tau)$, of the optical signal amplitude x(t), e.g., $$S_x^\alpha(f) \equiv \int_{-\infty}^{\infty} R_x^\alpha(\tau) \cdot \exp(-j2\pi f \tau) d\tau$$

wherein $R_x^\alpha(\tau)$ may represent cyclic auto-correlation function given by $$R_x^\alpha(\tau) \equiv \langle x(t+\tau/2) \cdot x^*(t-\tau/2) \cdot \exp(-j2\pi\alpha t) \rangle ,$$

and x(t) may be a time-varying complex two-dimensional Jones vector, which describes amplitude and phase variations of the two polarization components of the modulated signal as a function of time t. The brackets < > may denote time averaging over a time period that is substantially longer than the symbol period $T_{symbol}$ of the digital modulation. More generally, the averaging period, and accordingly the measurements of spectral components amplitudes, phases, and/or optical power levels/intensities, may be sufficiently long to ensure a pre-determined level of fidelity of computed correlations.

Alternatively, the SCDF may be expressed as a correlation function of the time-varying amplitudes of the spectral components of the modulated signal, e.g., as $$S_x^\alpha(f) = \langle X_T(t, f+\alpha/2) \cdot X_T^*(t, f-\alpha/2) \rangle$$

wherein $$X_T(t, v) = \int_{t-T/2}^{t+T/2} x(u) \cdot \exp(-j2\pi v u) du$$

and T may be an integration time with $T \gg T_{symbol}$. The brackets in the above expression may denote averaging over a time period substantially longer than the integration time T. For methods disclosed herein, it may be advantageous to define a normalized SCDF of the spectral correlations, e.g., $$\hat{S}_x^\alpha(f) = \frac{\langle X_T, (t, f+\alpha/2) \cdot X_T^*(t, f-\alpha/2) \rangle}{\sqrt{\langle |X_T(t, f+\alpha/2)|^2 \rangle} \sqrt{\langle |X_T(t, f-\alpha/2)|^2 \rangle}},$$

which may be similar to the un-balanced correlation coefficient used in statistical analysis, and which has the property $-1 \le \hat{S}_x^\alpha(f) \le 1$ for all values of f and a.

It should be appreciated that noiseless and otherwise undistorted optical signals encoded with binary amplitude-shift keying (ASK), binary phase-shift keying (BPSK), ordinary quaternary phase-shift keying (QPSK), and 16-quadrature-amplitude modulation (16-QAM) may exhibit $\hat{S}_x^\alpha(f)=1$ when $\alpha=\alpha_0=1/T_{symbol}$ and for all frequencies f within the range $-\alpha/2<f<-\alpha/2$. In addition, it should be appreciated that $\hat{S}_x^\alpha(f)=1$ when $\alpha=2/T_{symbol}$. However, it may be important to note that for optical signals encoded with staggered QPSK modulation, also referred to as "offset QPSK", $\hat{S}_x^\alpha(f) \approx 0$ when $\alpha=1/T_{symbol}$. For staggered QPSK $\hat{S}_x^\alpha(f)=1$ only when $\alpha=2/T_{symbol}$.

In contrast to modulated optical signals, optical ASE noise may be a random Gaussian process and, therefore, does not exhibit any significant correlation between its spectral components. Therefore, when random ASE noise is added to a modulated optical signal, the normalized SCDF may be smaller than unity, e.g., $S_x^\alpha(f)<1$, as described below in more detail. For example, when one allows n(t) to denote the Jones vector of the phase and amplitude of random ASE noise added to the transmitted signal, then the Jones vector $\tilde{X}_T(t,\nu)$ of the spectral component of the noisy signal at frequency $\nu$ may the sum of the noiseless Jones vector $X_T(t,\nu)$, defined above, and the corresponding Jones vector of the ASE noise $N_T(t,\nu)$, e.g., $$\tilde{X}_T(t,\nu) = t + \int_{t-T/2}^{t+T/2} (x(u)+n(u)) \cdot \exp(-j2\pi\nu u) du \equiv X_T(t,\nu) + N_T(t,\nu).$$

Consequently, the SCDF of a noisy modulated signal may be expressed as $$S_x^\alpha(f) = \langle \tilde{X}_T(t, f+\alpha/2) \cdot \tilde{X}_T^*(t, f-\alpha/2) \rangle$$
$$= \langle X_T(t, f+\alpha/2) \cdot X_T^*(t, f-\alpha/2) \rangle +$$
$$\langle N_T(t, f+\alpha/2) \cdot N_T^*(t, f-\alpha/2) \rangle$$

wherein the second term on the right side of the equation may vanishes when $|\alpha|>0$. It should be appreciated that $$\langle X_T(t,f+\alpha/2) \cdot N_T^*(t,f-\alpha/2) \rangle = \langle X_T(t,f+\alpha/2) \cdot N_T^*(t,f-\alpha/2) \rangle \equiv 0,$$

because amplitudes of random noise and modulated signal may be uncorrelated. Thus, the normalized SCDF for $\alpha>0$, e.g. for $\alpha=1/T_{symbol}$, may be represented by $$\hat{S}_x^\alpha(f) = \frac{\langle X_T(t, f+\alpha/2) \cdot X_T^*(t, f-\alpha/2) \rangle}{\sqrt{\langle |X_T(t, f+\alpha/2)|^2 + |N_T(t, f+\alpha/2)|^2 \rangle} \sqrt{\langle |X_T(t, f-\alpha/2)|^2 + |N_T(t, f-\alpha/2)|^2 \rangle}}$$

Assuming that the power spectrum of the modulated signal is symmetric about its carrier frequency $f_c$, which is generally the case for the aforementioned modulation formats, so that $$\langle |X_T(t,f_c+\alpha/2)|^2 \rangle = \langle |X_T(t,f_c-\alpha/2)|^2 \rangle \equiv \langle P_S(f_c\pm\alpha/2) \rangle,$$

and further assuming that the power spectrum of the random ASE also is substantially symmetric about $f_c$, which is frequently the case, so that $$\langle |N_T(t,f+\alpha/2)|^2 \rangle = \langle |N_T(t,f-\alpha/2)|^2 \rangle \equiv \langle P_N(f_c\pm\alpha/2) \rangle,$$

then the normalized SCDF at difference frequency $\alpha_0=1/T_{symbol}$ may be expressed as $$\hat{S}_x^{\alpha_0}(f_c) = \frac{\langle P_S(f_c\pm\alpha_0/2) \rangle}{\langle P_S(f_c\pm\alpha_0/2) \rangle + \langle P_N(f_c\pm\alpha_0/2) \rangle},$$

which, after rearrangement, may yield a signal-to-noise ratio, SNR, of the spectral components at the two optical frequencies $f_c-\alpha_0/2$ and $f_c+\alpha_0/2$, represented as $$SNR(f_c,\alpha_0) = \frac{\langle P_S(f_c\pm\alpha_0/2) \rangle}{\langle P_N(f_c\pm\alpha_0/2) \rangle} = \frac{\hat{S}_x^{\alpha_0}(f_c)}{1-\hat{S}_x^{\alpha_0}(f_c)},$$

and, similarly, the ratio of the total signal and noise power to the noise power at $f_c\pm\alpha_0/2$ as $$\frac{\langle P_S(f_c\pm\alpha_0/2) + P_N(f_c\pm\alpha_0/2) \rangle}{\langle P_N(f_c\pm\alpha_0/2) \rangle} = \frac{1}{1-\hat{S}_x^{\alpha_0}(f_c)}.$$

It should be appreciated that the OSNR of a transmitted signal may be defined as a ratio of the total signal power over the total noise power in an optical bandwidth $B_{noise}$ (usually equal to 0.1 nm, c.f. IEC 61280-2-9 "Digital systems—Optical signal-to-noise ratio measurements for dense wavelength-division multiplexed systems") as $$OSNR \equiv \frac{\sum_i \langle P_S(f_i) \rangle B_{meas}}{\langle P_N \rangle B_{noise}} = \frac{\sum_i \langle P_S(f_i)+P_N \rangle B_{meas}}{\langle P_N \rangle B_{noise}} - \sum_i \frac{B_{meas}}{B_{noise}},$$

wherein the summation may extend over all frequency components $f_i$ within the bandwidth of the signal, and $B_{meas}$ denotes the measurement bandwidth of each power measurement $\langle P_S(f_i) \rangle$ and $\langle P_N(f_i) \rangle$. It should appreciated that the above definition of OSNR assumes that the spectrum of the random ASE noise is substantially flat within the bandwidth of the modulated signal, so that the average noise power density is identical at all frequencies, e.g., $\langle P_N(f_i) \rangle = \langle P_N(f_j) \rangle \equiv \langle P \rangle$ for all frequencies $f_i \neq f_j$ within the bandwidth of the modulated optical signal. The in-band OSNR of a noisy signal may thus be determined from a measurement of the power spectrum of the transmitted noisy signal, i.e. of $\langle P_S(f) \rangle + \langle P_N(f) \rangle$, and an additional measurement of the average noise power, $\langle P_N(f) \rangle$, within a bandwidth of the modulated signal.

Whereas conventional single-polarized signals $\langle P_N \rangle$ may be directly measured by blocking the polarized signal with a properly oriented polarization filter, such measurements may not be performed with polarization-multiplexed signals. As disclosed herein, $\rangle P_N \rangle$ may be obtained from the spectral correlation of the complex Jones vectors of the signal amplitudes at optical frequencies $f_c-\alpha_0/2$ and $f_c+\alpha_0/2$, as described above, and may be expressed as a fraction of the noisy signal power at these frequencies, e.g., as $$\langle P_N \rangle = \langle P_S(f_c\pm\alpha_0/2)+P_N \rangle [1-\hat{S}_x^{\alpha_0}(f_c)].$$

It should be appreciated that this procedure may be applied to polarization-multiplexed signals, as well as to single-polarized signals. Substituting the above relation into the equation for OSNR may immediately yield desired in-band OSNR of the optical signal, $$OSNR = \frac{\sum_i \langle P_S(f_i)+P_N \rangle B_{meas}}{\langle P_S(f_c\pm\alpha_0/2)+P_N \rangle B_{noise}} \cdot \frac{1}{1-\hat{S}_x^{\alpha_0}(f_c)} - \sum_i \frac{B_{meas}}{B_{noise}}$$

-continued $$= \frac{\sum_i \{\langle P_S(f_i) + P_N\rangle - \langle P_S(f_c \pm \alpha_0/2) + P_N\rangle [1 - \hat{S}_x^{\alpha_0}(f_c)]\} B_{meas}}{\langle P_S(f_c \pm \alpha_0/2) + P_N\rangle [1 - \hat{S}_x^{\alpha_0}(f_c)] B_{noise}},$$

wherein all quantities may be known from the two measurements described above.

Therefore, the in-band OSNR of a transmitted noisy signal may be determined from a measurement of the spectral correlation of the optical amplitudes at frequencies $f_c \pm \alpha_0/2$ and a conventional spectral analysis of the combined signal and noise power, as shown in the example of FIG. 1 for a 100 Gb/s PM-QPSK noisy signal 30 compared with a noiseless signal 31. Spectral components 32 and 33 may be used for measuring the correlation coefficients at optical frequencies $f_c - \alpha_0/2$ and $f_c + \alpha_0/2$. The spectral components 32 and 33 may be preferably selected so that differences between each of optical frequencies of the spectral components 32 and 33 and the carrier frequency $f_c$ of the modulated optical signal in the selected wavelength channel are substantially of equal magnitude $\alpha_0/2$, so that the frequency interval may be substantially equal to the symbol repetition frequency, or an integer multiple of the symbol repetition frequency. More generally, any two predetermined optical frequencies in a selected one of the plurality of wavelength channels may be used, provided that the optical frequencies are separated by a non-zero frequency interval.

It should be noted that the above described technique does not require foreknowledge of the time-varying waveform or the particular modulation format of the transmitted optical signal. Therefore, determination of the in-band OSNR may not require any calibration with a noiseless signal, e.g., the noiseless signal 31. The only foreknowledge required for this technique may be acknowledging that the noiseless signal exhibits a spectral amplitude correlation at frequencies $f_c \pm \alpha_0/2$ with $\hat{S}_x^{\alpha_0}(f_c)=1$. While it may be advantageous to have foreknowledge of the symbol period $T_{symbol}$ of the modulated signal, in order to determine the frequencies $f_c \pm \alpha_0/2$, this information may not be required when $\hat{S}_x^{\alpha}(f_c)$ is measured at a multitude of frequency pairs $f_c \pm \alpha/2$, with $\alpha$ ideally ranging from 0 to the largest possible value, and when $\langle P_N \rangle$ is determined from the maximal value of $\hat{S}_x^{\alpha}(f_c)$ observed in this multitude of measurements. Advantageously, the frequency range where $\hat{S}_x^{\alpha}(f_c)$ is expected to be maximal may be determined from a simple analysis of the signal's power spectrum. Preferably, the frequency interval between the measured spectral components, e.g., the spectral components 32 and 33 of FIG. 1, may be substantially equal to the symbol repetition frequency of the modulated optical signal in the selected wavelength channel, or an integer multiple thereof. It is further preferable that differences between each of the first and second optical frequencies of the measured spectral components, and the carrier frequency $f_c$ of the modulated optical signal in the selected wavelength channel may be substantially of equal magnitude.

Figure 2:
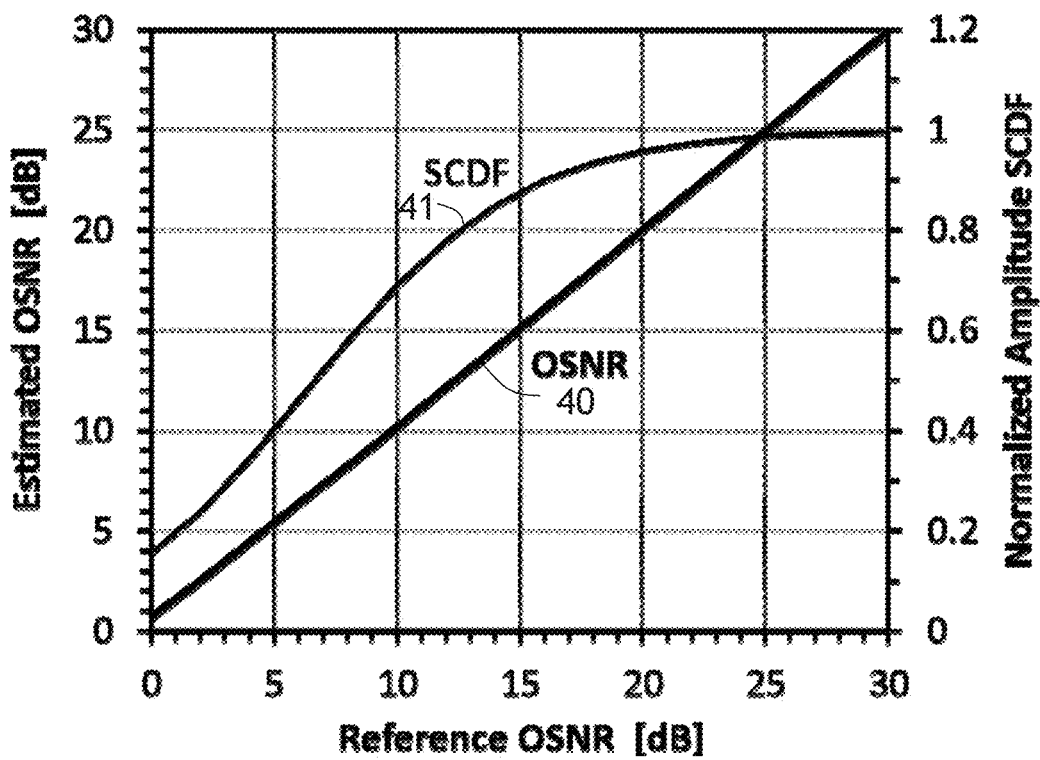
FIG. 2 illustrates a plot of a normalized amplitude spectral correlation density function (SCDF) evaluated at two spaced apart optical frequencies and of the OSNR estimated form the SCDF versus "true" in-band OSNR in a 100 Gb/s polarization-multiplexed RZ-QPSK signal.

The in-band OSNR measurement method as disclosed herein, for example, may be applied to transmitted signals that are encoded with chirp-free ASK, BPSK, ordinary QPSK, and other higher-order M-ary QAM formats without requiring detailed knowledge of the particular modulation format encoded in the analyzed noisy signal. Referring to FIG. 2, for instance, a numerical simulation of the in-band OSNR determined from the above equation is shown for a 100 Gb/s polarization-multiplexed QPSK signal. It can be seen from FIG. 2 that an estimated in-band OSNR 40 is substantially equal to the reference OSNR over a range from at least 0 dB to 30 dB. A normalized SCDF 41 is plotted for a reference.

Figure 3:
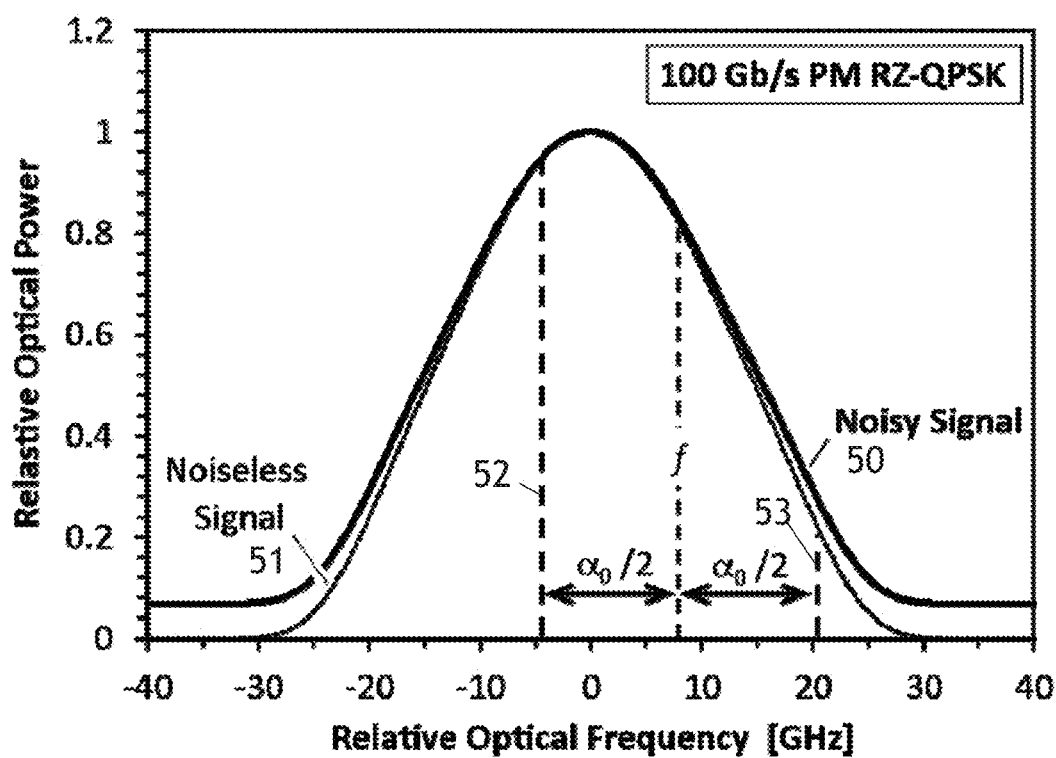
FIG. 3 illustrates a plot of an optical power spectrum of a noisy 100 Gb/s polarization-multiplexed RZ-QPSK signal, showing an example of the spectral components used for correlation measurements, in which the center frequency f is offset from the carrier frequency $f_c$ of the signal.

According to an example, the in-band OSNR of a transmitted noisy signal may be determined from a measurement of the spectral correlation of the optical amplitudes at any combination of frequencies $f \pm \alpha/2$ for which $\hat{S}_x^{\alpha_0}(f)=1$. It should be appreciated that digitally modulated signals encoded with ASK, BPSK, QPSK, or 16-QAM, for example, may exhibit $S_x^{\alpha_0}(f)=1$, as long as the two optical frequencies $f-\alpha_0/2$ and $f+\alpha_0/2$ are within the optical bandwidth of the modulated signal. This is illustrated in FIG. 3 for the example of a 100 Gb/s PM RZ-QPSK noisy signal 50, compared with a noiseless signal 51. In FIG. 3, optical frequencies 52 and 53, at which the time-varying signal measurements are performed, may be offset from the carrier frequency $f_c$. However, it should be appreciated that the bandwidth of the transmitted optical signal may be limited by the spectral width of the DWDM channel. For example, when 50 Gb/s PM-BPSK, 100 Gb/s PM-QPSK, or 200 Gb/s PM-16-QAM signals (all having $T_{symbol}=40$ ps) are transmitted through a 50-GHz wide DWDM channel, the useful values off may be restricted to the range $f_c-\alpha_0/2<f<f_c+\alpha_0/2$.

In the case of $f \neq f_c$ as shown in FIG. 3, it should be appreciated that $\langle P_S(f+\alpha_0/2) \rangle \neq \langle P_S(f-\alpha_0/2) \rangle$, so that the process of determining the OSNR may become more complicated. For example, denoting $\langle P_S(f+\alpha_0/2) \rangle = C \langle P_S(f-\alpha_0/2) \rangle \equiv C \langle P_S \rangle$, with $C>0$ being a real number, the normalized SCDF may be represented by $$\hat{S}_x^{\alpha_0}(f) = \frac{\sqrt{C}\langle P_S \rangle}{\sqrt{\langle CP_S + P_N \rangle}\sqrt{\langle P_S + P_N \rangle}},$$

which may be solved analytically or numerically for $\langle P_N \rangle / (\langle P_S \rangle + \langle P_N \rangle)$.

However, at large OSNR values, it should be appreciated that $\langle P_S \rangle \gg \langle P_N \rangle$, so that the normalized SCDF may be approximated as $$\hat{S}_x^{\alpha_0}(f) \approx \frac{\langle P_S \rangle^2}{\langle P_S \rangle^2 + \frac{C+1}{2C}\langle P_S \rangle\langle P_N \rangle + \frac{\langle P_N \rangle^2}{2C}},$$

from which the average noise power $\langle P_N \rangle$ at the two frequencies $f \pm \alpha_0/2$ may be readily calculated as $$\frac{\langle P_N \rangle}{\langle P_S(f - \alpha_0/2) \rangle} = -\frac{C+1}{2} + \sqrt{\left(\frac{C+1}{2}\right)^2 + 2C\frac{1 - \hat{S}_x^{\alpha_0}(f)}{\hat{S}_x^{\alpha_0}(f)}}$$

$$\approx \frac{2C}{C+1} \cdot \frac{1 - \hat{S}_x^{\alpha_0}(f)}{\hat{S}_x^{\alpha_0}(f)},$$

or more conveniently as $$\frac{\langle P_N \rangle}{\langle P_S(f - \alpha_0/2) + P_N \rangle} \approx \frac{2C[1 - \hat{S}_x^{\alpha_0}(f)]}{2C + (1 - C)\hat{S}_x^{\alpha_0}(f)},$$

so that the in-band OSNR may be represented as $$OSNR \approx \frac{\sum_i \langle P_S(f_i) + P_N \rangle B_{meas}}{\langle P_S(f_c - \alpha_0/2) + P_N \rangle B_{noise}} \cdot \frac{1 + \frac{1-C}{2C}\hat{S}_x^{\alpha_0}(f)}{1 - \hat{S}_x^{\alpha_0}(f)} - \sum_i \frac{B_{meas}}{B_{noise}}$$

$$= \frac{\sum_i \{\langle P_S(f_i) + P_N \rangle - \langle P_S(f_c - \alpha_0/2) + P_N \rangle \frac{2C[1-\hat{S}_x^{\alpha_0}(f)]}{2C+(1-C)\hat{S}_x^{\alpha_0}(f)}\} B_{meas}}{\langle P_S(f_c - \alpha_0/2) + P_N \rangle \frac{2C[1-\hat{S}_x^{\alpha_0}(f)]}{2C+(1-C)\hat{S}_x^{\alpha_0}(f)} B_{noise}}$$

Therefore, in-band OSNR of a transmitted noisy signal may be determined from a measurement of the spectral correlation of the optical amplitudes at arbitrary frequencies f+$\alpha_0$/2 and an additional measurement of the optical power spectrum of the noisy signal. Again, this technique, advantageously, may not require foreknowledge of the particular modulation format, bit-rate, or time-varying waveform of the transmitted signal. If the symbol period 1/$\alpha_0$ of the signal is unknown, a suitable fixed value may be chosen for f-$\alpha_0$/2, and then $S_x^\alpha$(f) may be measured at a multitude of frequency pairs {f-$\alpha_0$/2,f+$\alpha$/2}, with a ranging from 0 to the largest expected value. $\langle P_N \rangle$ may then be determined from a maximal value of $\hat{S}_x^\alpha(f_c)$ observed in these measurements.

However, accurate determination of the in-band OSNR may require foreknowledge of the ratio C of the two noiseless signal powers at f±$\alpha_0$/2, which may be determined from a measurement of the optical power spectrum of the noiseless signal (e.g. directly after the transmitter). If such measurement is not available, the first-order approximation may be used $$C \approx C_1 = \frac{\langle P_S(f - \alpha_0/2) + P_N \rangle}{\langle P_S(f + \alpha_0/2) + P_N \rangle},$$

to estimate the in-band OSNR in the signal, $$OSNR \approx \frac{\sum_i \langle P_S(f_i) + P_N \rangle B_{meas}}{\langle P_S(f_c - \alpha_0/2) + P_N \rangle B_{noise}} \cdot \frac{1 + \frac{1-C_1}{2C_1}\hat{S}_x^{\alpha_0}(f)}{1 - \hat{S}_x^{\alpha_0}(f)} - \sum_i \frac{B_{meas}}{B_{noise}}$$

Figure 4:
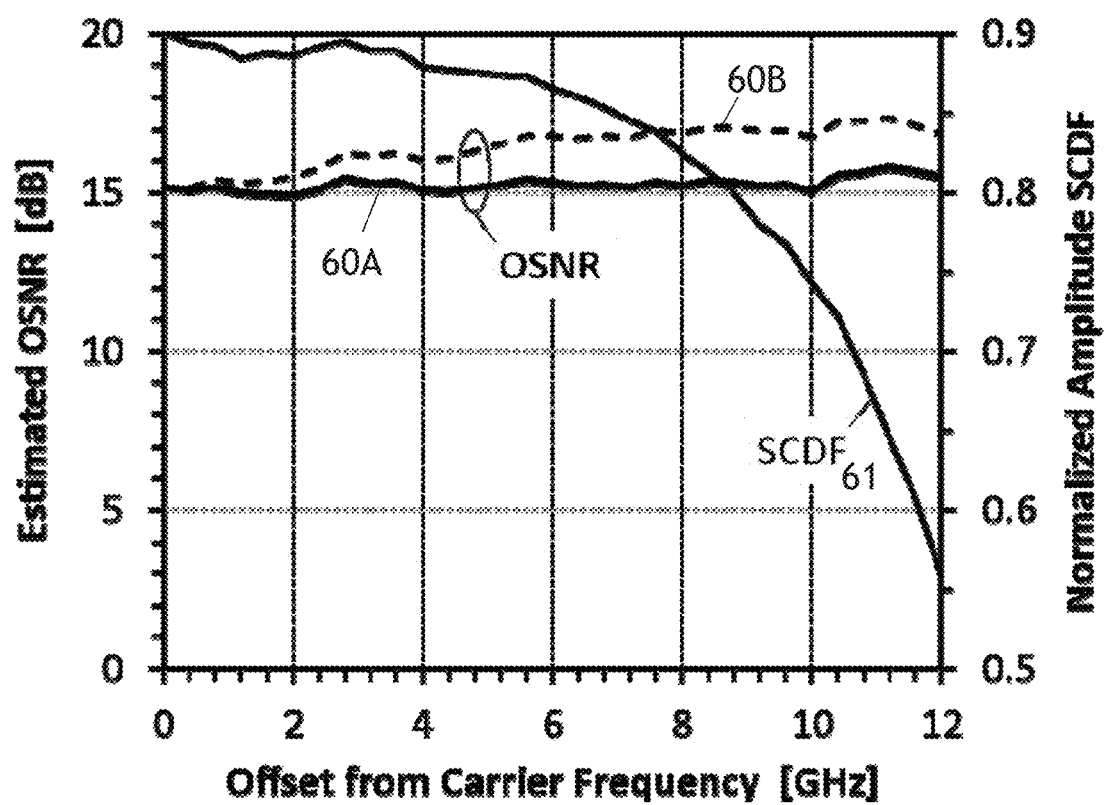
FIG. 4 illustrates a plot of a normalized amplitude SCDF and estimated OSNR versus frequency offset $f-f_c$, for a 100 Gb/s polarization-multiplexed RZ-QPSK signal.

Referring to FIG. 4, an example may be shown of OSNR curves 60A and 60B estimated from a numerically simulated noisy 100 Gb/s PM-QPSK signal having an OSNR of 15 dB. The graph may also display a normalized amplitude SCDF 61 as a function of the frequency offset f-$f_c$. OSNR 60A has been calculated from the above equation using the first-order approximation C≈$C_1$ (the SCDF 61 may be shown in bold and the OSNR 60A may be shown by solid curves). It may be appreciated that this approximation may slightly overestimate the OSNR at offset frequencies beyond 8 GHz, where the signal power $\langle P_S(f+\alpha_0/2) \rangle$ may be small and comparable to the noise power $\langle P_N \rangle$, as seen in FIG. 3. For comparison, the dashed curve 60B in FIG. 4 may display the in-band OSNR calculated from the exact formula for C=1. It is evident from this curve that this formula may lead to a substantial overestimation of the OSNR, e.g., by up to and more than 2 dB.

If the first-order approximation of C is not deemed to be accurate enough to determine the in-band OSNR, a second-order approximation may be employed, which may be obtained by subtracting the first-order average noise power $$\langle P_{N1} \rangle \approx \langle P_S(f - \alpha_0/2) + P_N \rangle \frac{2C_1[1 - \hat{S}_x^{\alpha_0}(f)]}{2C_1 + (1 - C_1)\hat{S}_x^{\alpha_0}(f)}$$

from the two noisy signal powers measured at frequencies f±$\alpha_0$/2 and by recalculating C as $$C \approx C_2 = \frac{\langle P_S(f - \alpha_0/2) + P_N \rangle - \langle P_{N1} \rangle}{\langle P_S(f + \alpha_0/2) + P_N \rangle - \langle P_{N1} \rangle},$$

which may then be used for an improved second-order approximation of the in-band OSNR, $$OSNR \approx \frac{\sum_i \{P_S(f_i) + P_N\} B_{meas}}{\langle P_S(f_c - \alpha_0/2) + P_N \rangle B_{noise}} \cdot \frac{1 + \frac{1-C_2}{2C_2}\hat{S}_x^{\alpha_0}(f)}{1 - \hat{S}_x^{\alpha_0}(f)} - \sum_i \frac{B_{meas}}{B_{noise}}.$$

The above described technique may be iterated multiple times, as needed, until a desired accuracy of the in-band OSNR is obtained.

Amplitudes of the spectral components of a transmitted signal may depend quite sensitively on signal distortions caused by chromatic dispersion (CD) or polarization-mode dispersion (PMD), which the modulated signal may have experienced in the transmission link prior to being analyzed at the OSNR monitoring point. Group velocity dispersion (GVD) from CD, for example, may introduce a differential phase shift between the spectral amplitudes of the Jones vectors $X_T$(t,f+$\alpha$/2) and $X_T$(t,f-$\alpha$/2), whereas PMD-induced differential group delays (DGDs) may introduce a differential polarization transformation between the two Jones vectors. Consequently, the correlation between the two spectral components may become severely distorted, so that $\hat{S}_x^{\alpha_0}(f)$ <1 even for noiseless signals. Therefore, uncompensated GVD and/or DGD in the noisy signal may lead to a substantial underestimation of the in-band OSNR when using the spectral correlation method disclosed above.

Fortunately, the differential phase shifts caused CD and the differential polarization transformation caused by PMD may be compensated for by artificially introducing differential phase shifts and/or differential polarization transformations in the measured Jones vectors $X_T$(t,f+$\alpha_0$/2) and $X_T$(t,f-$\alpha_0$/2), and by varying these phase shifts and/or polarization transformations until $\hat{S}_x^{\alpha_0}(f)$ is maximal. To that end, determining the correlation may include (i) removing differential phase and time delays introduced by chromatic dispersion in the transmission link between the time-varying parameters at the optical frequencies, at which the measurement is performed; and (ii) removing a differential group delay introduced by polarization mode dispersion in the transmission link between the time-varying parameters at the first and second optical frequencies. Even if the GVD- and DGD-induced distortions in the signal amplitudes are not perfectly compensated, such procedure may substantially reduce errors of determining the in-band OSNR from the measured spectral correlation.

In another example, end-to-end GVD and DGD in the transmission link may be determined from an adaptive compensation of the GVD and DGD in the measured signal amplitudes using the above described algorithm for maximizing $\hat{S}_x^{\alpha_0}(f)$.

Figure 5:
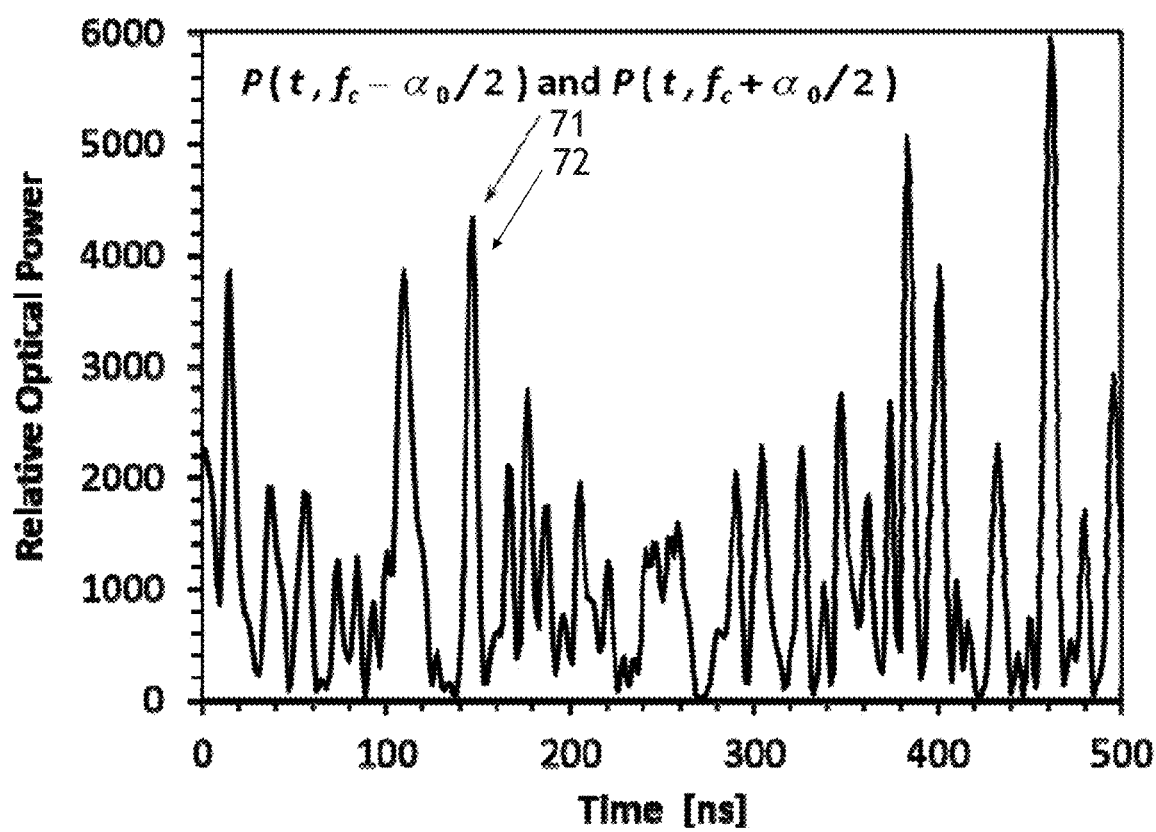
FIG. 5 illustrates a plot of optical power variations in two spectral components of a substantially noiseless 100 Gb/s PM-QPSK signal (>40 dB OSNR), measured at two spaced apart optical frequencies, with an optical bandwidth of 200 MHz.

The in-band OSNR may also be determined from the spectral correlations of the optical signal intensities (or signal powers) at two different frequencies, i.e. from the correlations between the spectral power components $\tilde{P}(t,v) = |\tilde{X}_T(t,v)|^2$. It follows from the above considerations that the spectral components of the signal power exhibit strong correlations whenever the spectral components of the signal amplitude are strongly correlated. Consequently, modulated optical signals encoded with ASK, BPSK, ordinary QPSK and 16-QAM formats exhibit strong correlations of the time-varying optical power components at frequencies $f+\alpha_0/2$. An example of the strong correlations between the time-varying signal powers 71, 72 at $f_c \pm \alpha_0/2$ may be shown in FIG. 5 for a noiseless 100 Gb/s PM-QPSK signal. It may be seen from FIG. 5 that the power variations 71, 72 at the two frequencies may overlap completely, e.g., they are substantially identical.

It should be appreciated that signals encoded with ASK and BPSK modulation may exhibit additional correlations of the spectral power components beyond those found for the spectral amplitude components. It may be shown, for example, that the spectral power components of ASK and BPSK signals are correlated at any two pairs of frequencies $f_c \pm \alpha/2$ within the bandwidth of the signal, e.g., for arbitrary offset frequency $\alpha$.

Figure 6:
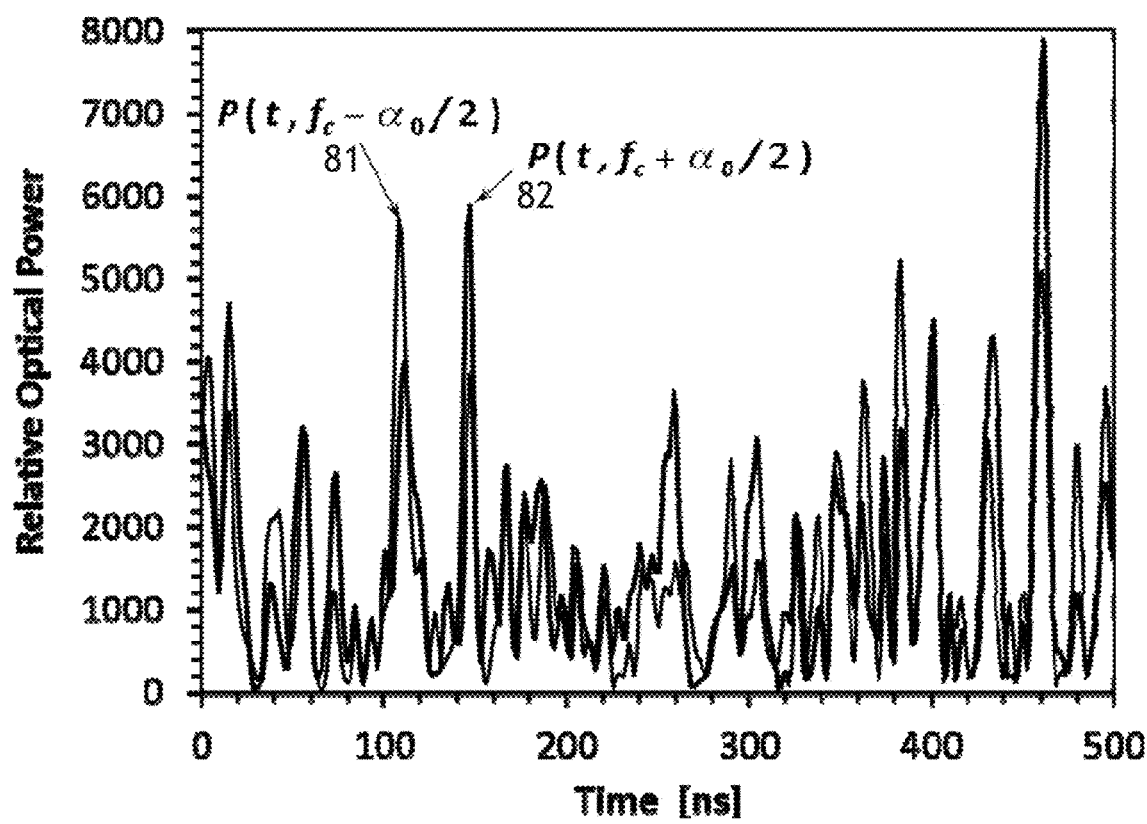
FIG. 6 illustrates a plot of optical power variations in two spectral components of a noisy 100 Gb/s PM-QPSK signal having an OSNR of only 12 dB OSNR, measured at two spaced apart optical frequencies, with an optical bandwidth of 200 MHz.

Just like for the optical amplitudes, spectral components of the optical power levels of random ASE noise may not exhibit any significant correlations. When optical noise is added to a modulated signal, therefore, the correlation between the spectral components of the noisy signal power may decrease with decreasing OSNR. An example of the reduced spectral correlations between the optical powers at $f_c \pm \alpha_0/2$ may be shown in FIG. 6 for a noisy 100 Gb/s PM-QPSK signal having an OSNR of only 12 dB. It may be seen from this graph that variations 81, 82 of the two optical powers with time may be substantially different.

Figure 7:
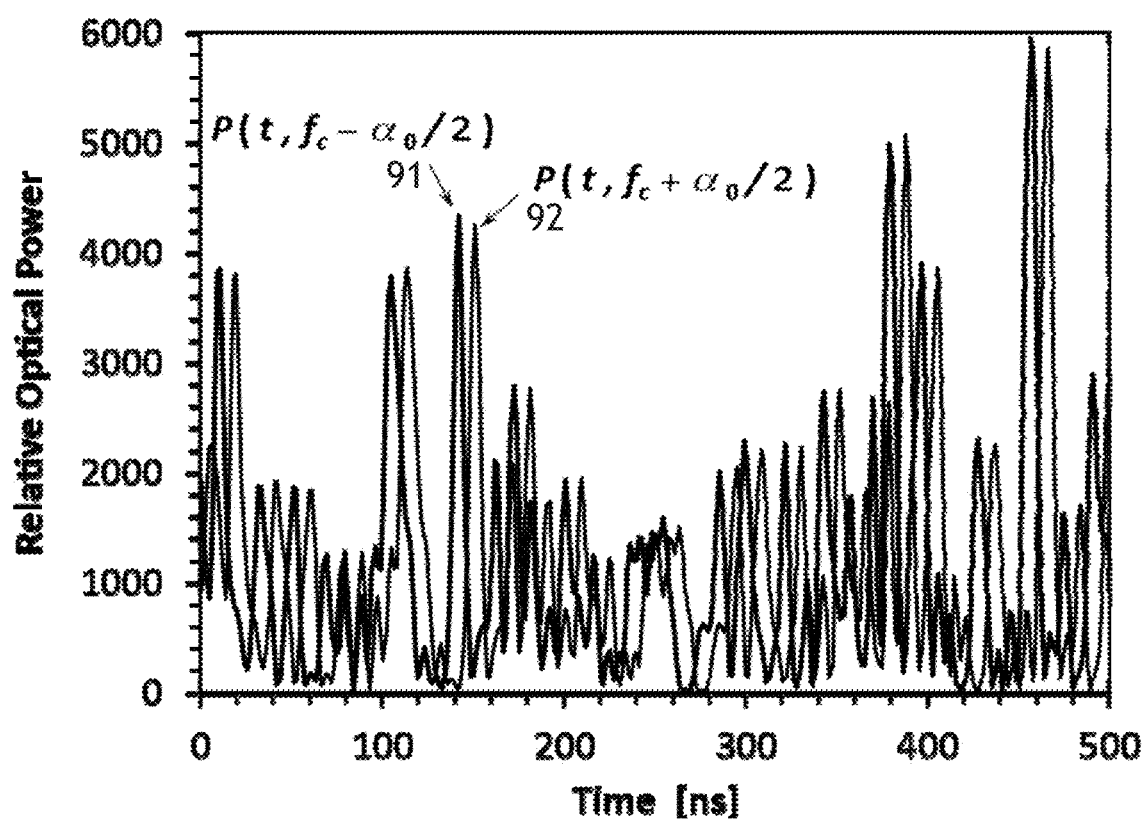
FIG. 7 illustrates a plot of optical power variations of two spectral components of a noiseless 100 Gb/s PM-QPSK signal distorted by chromatic dispersion with 50,000 ps/nm GVD.

Furthermore, it should be appreciated that the spectral correlations of the optical signal power may be much less sensitive to waveform distortions caused by PMD and CD than the correlations of the optical signal amplitudes. In general, GVD from CD and/or DGD from PMD may introduce a differential time delay $\Delta t$ between the time-varying optical power measurements $\tilde{P}(t,f-\alpha/2)$ and $\tilde{P}(t,f+\alpha/2)$, leading to signals of the form $\tilde{P}(t-\Delta t/2, f-\alpha/2)$ and $\tilde{P}(t+\Delta t/2, f+\alpha/2)$, as shown in FIG. 7 for the example of a 100 Gb/s PM-QPSK signal distorted by 50 ns/nm GVD. Two curves 91, 92 in FIG. 7 may be shifted in time by about 10 ns, but are otherwise substantially identical. Accordingly, these differential time delays may substantially reduce the spectral correlations in a noise-free signal and, hence, may need to be compensated prior to calculating the correlation between the two signals. This may be accomplished, for example, by introducing a variable time-delay between the two signals and by adaptively varying this delay until the correlation between the two signals is maximal.

In an example, it may be advantageous to define a normalized power SCDF for the spectral power components $\tilde{P}(t,f-\alpha/2) = |\tilde{X}_T(t,f-\alpha/2)|^2$ and $\tilde{P}(t,f+\alpha/2) = |\tilde{X}_T(t,f+\alpha/2)|^2$ of the noisy signal, analogous to the normalized amplitude SCDF described above:

$$\hat{S}_p^\alpha(f) \equiv \frac{\langle \tilde{P}(t, f+\alpha/2) \cdot \tilde{P}(t, f-\alpha/2)\rangle}{\sqrt{\langle[\tilde{P}(t, f+\alpha/2)]^2\rangle}\sqrt{\langle[\tilde{P}(t, f-\alpha/2)]^2\rangle}}.$$

It may be shown that noiseless signals encoded with ASK-, BPSK-, ordinary QPSK- and 16-QAM modulation exhibit $\hat{S}_p^{\alpha_0}(f)=1$ at any two frequency pairs $f \pm \alpha_0/2$ which may be within the optical bandwidth of the transmitted signal. For modulated signals with added ASE noise, the normalized power SCDF may generally be less than unity, e.g., $\hat{S}_p^{\alpha_0}(f)<1$ just like the normalized amplitude SCDF. The normalized power SCDF for noisy signals may be calculated analytically as described below.

In the case of $\alpha \gg 1/T$, which is of interest in the present disclosure, the numerator of $\hat{S}_p^\alpha(f)$ may be expanded into the following terms $$\langle \tilde{P}(t,f+\alpha/2) \cdot \tilde{P}(t,f-\alpha/2)\rangle = \langle P_S(t,f+\alpha/2) \cdot P_S(t,f-\alpha/2)\rangle + \langle P_S(t,f+\alpha/2) \cdot P_N(t,f-\alpha/2)\rangle + \langle P_N(t,f+\alpha/2) \cdot P_S(t,f-\alpha/2)\rangle + \langle P_N(t,f+\alpha/2) \cdot P_N(t,f-\alpha/2)\rangle,$$

wherein $$\langle P_S(t,f+\alpha/2) \cdot P_N(t,f-\alpha/2)\rangle = \langle P_S(t,f+\alpha/2)\rangle \cdot \langle P_N(t,f-\alpha/2)\rangle,$$

and likewise $$\langle P_N(t,f+\alpha/2) \cdot P_S(t,f-\alpha/2)\rangle = \langle P_N(t,f+\alpha/2)\rangle \cdot \langle P_S(t,f-\alpha/2)\rangle,$$

because the time-varying signal amplitudes may not be correlated with the random variations of the noise amplitudes. Furthermore, since the random noise power variations at substantially different optical frequencies may be uncorrelated, this may result in the following expression $$\langle P_N(t,f+\alpha/2) \cdot P_N(t,f-\alpha/2)\rangle = \langle P_N(t,f+\alpha/2)\rangle \cdot \langle P_N(t,f-\alpha/2)\rangle = \langle P_N(t,f+\alpha/2)\rangle^2.$$

Similarly, the two terms in the denominator of $\hat{S}_p^\alpha(f)$ may be expressed as $$\langle [\tilde{P}(t,f+\alpha/2)]^2\rangle = \langle [P_S(t,f+\alpha/2)]^2\rangle + \langle [P_N(t,f+\alpha/2)]^2\rangle + 3\langle P_S(t,f+\alpha/2)\rangle \cdot \langle P_N(t,f+\alpha/2)\rangle$$

$$\langle [\tilde{P}(t,f-\alpha/2)]^2\rangle = \langle [P_S(t,f-\alpha/2)]^2\rangle + \langle [P_N(t,f-\alpha/2)]^2\rangle + 3\langle P_S(t,f-\alpha/2)\rangle \cdot \langle P_N(t,f-\alpha/2)\rangle,$$

wherein the third term on the right side of these equations may include the contribution $$\langle \{Re[X_T(t, f \pm \alpha/2) \cdot N_T^*(t, f \pm \alpha/2)]\}^2\rangle = \frac{1}{4}\langle P_S(t, f \pm \alpha/2)\rangle \cdot \langle P_N(t, f \pm \alpha/2)\rangle.$$

Therefore, in the special case of $f=f_c$ and $\alpha=\alpha_0$, the power SCDF may be written in the form $$\hat{S}_p^{\alpha_0}(f_c) = \frac{\langle P_S^2(f_c \pm \alpha_0/2)\rangle + 2\langle P_S(f_c \pm \alpha_0/2)\rangle \cdot \langle P_N\rangle + \langle P_N\rangle^2}{\langle P_S^2(f_c \pm \alpha_0/2)\rangle + 3\langle P_S(f_c \pm \alpha_0/2)\rangle\langle P_N\rangle + \langle P_N^2\rangle},$$

wherein $$\langle P_N \rangle = \langle P_N(t, f_c + \alpha_0/2) \rangle = \langle P_N(t, f_c - \alpha_0/2) \rangle,$$

$$\langle P_N^2 \rangle = \langle [P_N(t, f_c + \alpha_0/2)]^2 \rangle = \langle [P_N(t, f_c - \alpha_0/2)]^2 \rangle.$$

The above expression for power SCDF may contain two unknown and potentially large quantities, $\langle P_S^2 \rangle$ and $\langle P_N^2 \rangle$, which may not be directly measured or obtained from the measurements of the combined signal and noise powers at frequencies $f+\alpha/2$ and $f-\alpha/2$.

It should be appreciated that the averaged squared noise power $\langle P_N^2 \rangle$ may related to the average noise power $\langle P_N \rangle$ as $\langle P_N^2 \rangle = 1.5 \langle P_N \rangle^2$, because of the statistical properties of random ASE noise. In an example, optical ASE noise may be described as a Gaussian random process, which remains a Gaussian random process even after arbitrary linear optical filtering (e.g., before or in the optical receiver). Thus, the relation $\langle P_N^2 \rangle = 1.5 \langle P_N \rangle^2$ may be obtained from the known second and fourth moments of a Gaussian random process.

Furthermore, according to an example, $\langle P_S^2 \rangle$ may be eliminated by multiplying the complementary power SCDF, $$1 - \hat{S}_p^{\alpha_0}(f_c) = \frac{\langle P_N^2 \rangle - \langle P_N \rangle^2 + \langle P_S(f_c \pm \alpha_0/2) \rangle \cdot \langle P_N \rangle}{\langle P_S^2(f_c \pm \alpha_0/2) \rangle + 3 \langle P_S(f_c \pm \alpha_0/2) \rangle \cdot \langle P_N \rangle + \langle P_N^2 \rangle},$$

with the dimensionless factor $D(f_c, \alpha_0)$, defined as $$D(f, \alpha) \equiv \frac{\sqrt{\langle [\tilde{P}(t, f + \alpha/2)]^2 \rangle} \sqrt{\langle [\tilde{P}(t, f - \alpha/2)]^2 \rangle}}{\langle \tilde{P}(t, f + \alpha/2) \rangle \cdot \langle \tilde{P}(t, f - \alpha/2) \rangle},$$

which may be readily calculated from the measured signal and noise powers $\tilde{P}(t, f \pm \alpha/2)$.

At optical frequencies $f_c + \alpha_0/2$ and $f_c - \alpha_0/2$, this expression may be obtained $$D(f_c, \alpha_0) = \frac{\rangle P_S^2(f_c \pm \alpha_0/2)\langle + 3 \rangle P_S(f_c \pm \alpha_0/2)\langle \cdot \rangle P_N \langle + \rangle P_N^2 \langle}{\rangle P_S(f_c \pm \alpha_0/2) \langle^2 + 2 \rangle P_S(f_c \pm \alpha_0/2) \langle \cdot \rangle P_N \langle + \rangle P_N \langle^2},$$

and after multiplication with the complementary power SCDF, it may be expressed as follows $$\hat{D}_p^{\alpha_0}(f_c) \equiv [1 - \hat{S}_p^{\alpha_0}(f_c)] D(f_c, \alpha_0) = \frac{0.5 \langle P_N \rangle^2 + \langle P_S(f_c \pm \alpha_0/2) \rangle \cdot \langle P_N \rangle}{\langle P_S(f_c \pm \alpha_0/2) + P_N \rangle^2}.$$

This equation may then be solved for $\langle P_N \rangle$ $$\frac{\langle P_N \rangle}{\langle P_S(f_c \pm \alpha_0/2) + P_N \rangle} = 1 - \sqrt{1 - 2\hat{D}_p^{\alpha_0}(f_c)},$$

and substituted into the equation for OSNR to produce $$OSNR = \frac{\sum_i \langle P_S(f_i) + P_N \rangle B_{meas}}{\langle P_S(f_c \pm \alpha_0/2) + P_N \rangle B_{noise}} \cdot \frac{1}{1 - \sqrt{1 - 2\hat{D}_p^{\alpha_0}(f_c)}} - \sum_i \frac{B_{meas}}{B_{noise}},$$

$$= \frac{\sum_i \left\{ \langle P_S(f_i) + P_N \rangle - \langle P_S(f_c \pm \alpha_0/2) + P_N \rangle \left[ 1 - \sqrt{1 - 2\hat{D}_p^{\alpha_0}(f_c)} \right] \right\} B_{meas}}{\langle P_S(f_c \pm \alpha_0/2) + P_N \rangle \left[ 1 - \sqrt{1 - 2\hat{D}_p^{\alpha_0}(f_c)} \right] B_{noise}}$$

wherein again the summation may extend over the entire spectral width of the transmitted optical signal.

Therefore, the in-band OSNR in a noisy signal may be determined from a spectral correlation measurement of the signal powers at optical frequencies $f_c + \alpha_0/2$ and $f_c - \alpha_0/2$. Just like in the case of using correlation measurements of the signal's amplitude, these measurements may not require foreknowledge of the signal's modulation format, bitrate, or waveform, which is advantageous for the reasons described herein.

Figure 8:
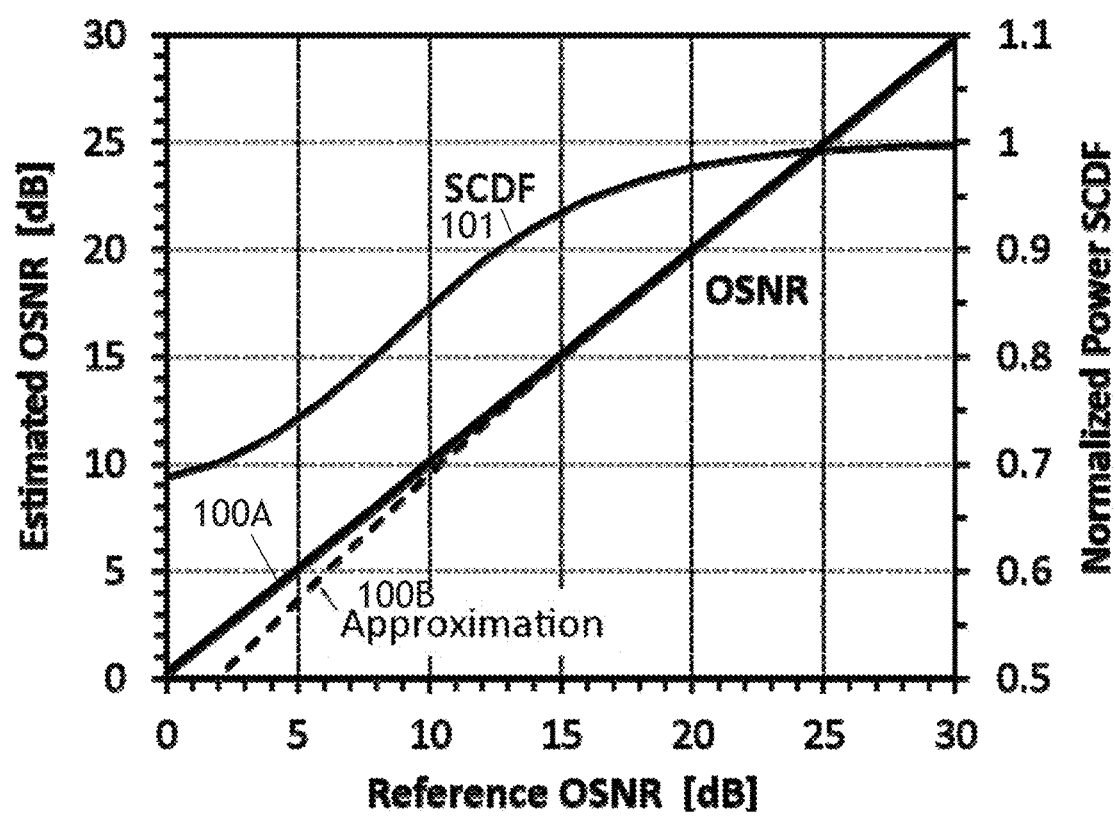
FIG. 8 illustrates a plot of the normalized power SCDF at two spaced apart optical frequencies centered around $f_c$, and the estimated OSNR calculated for a 100 Gb/s PM RZ-QPSK signal.

For large OSNR values (e.g., larger than 15 dB for a 100 Gb/s PM RZ-QPSK signal), one may approximate the in-band OSNR by the simpler expression $$OSNR \approx \frac{\sum_i \langle P_S(f_i) + P_N \rangle B_{meas}}{\langle P_S(f_c \pm \alpha_0/2) + P_N \rangle B_{noise}} \cdot \left[ \frac{1}{\hat{D}_p^{\alpha_0}(f_c)} - 1 \right] - \sum_i \frac{B_{meas}}{B_{noise}},$$

$$\approx \frac{\sum_i \langle P_S(f_i) + P_N \rangle B_{meas}}{\langle P_S(f_c \pm \alpha_0/2) + P_N \rangle B_{noise}} \cdot \frac{1}{\hat{D}_p^{\alpha_0}(f_c)} - \sum_i \frac{B_{meas}}{B_{noise}}$$

$$= \frac{\sum_i \left\{ \langle P_S(f_i) + P_N \rangle - \langle P_S(f_c \pm \alpha_0/2) + P_N \rangle \hat{D}_p^{\alpha_0}(f_c) \right\} B_{meas}}{\langle P_S(f_c \pm \alpha_0/2) + P_N \rangle \hat{D}_p^{\alpha_0}(f_c) B_{noise}}$$

because $\langle P_N \rangle \ll \langle P_S \rangle$, so that $\hat{S}_P^{\alpha_0}(f_c) \approx 1$ and hence $\hat{D}_P^{\alpha_0}(f_c) \ll 1$. FIG. 8 displays a numerical simulation of the reference in-band OSNR 100A determined from the above equation for a 100 Gb/s PM-QPSK signal. The reference in-band OSNR 100A is shown with a thick solid line. A normalized power SCDF 101 at $f_c \pm \alpha_0/2$ may also be shown. It should be appreciated that an estimated in-band OSNR 100B, shown with a dashed line, may be substantially equal to the reference in-band OSNR 100A over a range from about 15 dB to at least 30 dB.

Importantly, in-band OSNR may be determined from a spectral correlation measurement of transmitted signal powers at any frequency pair $f \pm \alpha_0/2$ within the spectral bandwidth of the signal, similar to the spectral correlation measurement of the transmitted signal amplitudes described above. Letting again $\langle P_S(f + \alpha_0/2) \rangle = C \langle P_S(f - \alpha_0/2) \rangle = C \langle P_S \rangle$, with $C>1$ being a real number, the normalized SCDF of the signal powers may take the general form $$\hat{S}_p^{\alpha_0}(f) = \frac{C \langle P_S^2 \rangle + (1+C) \langle P_S \rangle \cdot \langle P_N \rangle + \langle P_N \rangle^2}{\sqrt{\langle P_S^2 \rangle + 3 \langle P_S \rangle \cdot \langle P_N \rangle + \langle P_N^2 \rangle} \sqrt{C^2 \langle P_S^2 \rangle + 3C \langle P_S \rangle \cdot \langle P_N \rangle + \langle P_N^2 \rangle}},$$

wherein $\langle P_N^2 \rangle = 1.5 \langle P_N \rangle^2$. It may be possible to eliminate he unknown quantity $\langle P_S^2 \rangle$ from the above equation, using the dimensionless factor $$D(f, \alpha_0) = \frac{\sqrt{\langle P_S^2 \rangle + 3\langle P_S \rangle\langle P_N \rangle + \langle P_N^2 \rangle}\sqrt{C^2\langle P_S^2 \rangle + 3C\langle P_S \rangle\langle P_N \rangle + \langle P_N^2 \rangle}}{\langle CP_S + P_N \rangle\langle P_S + P_N \rangle},$$

but the results tend to be fairly complex.

For signals with relatively large OSNR (e.g., above 15 dB for a 100 Gb/s PM RZ-QPSK signal), the terms proportional to $\langle P_N \rangle^2$ and $\langle P_N \rangle^2$ may be neglected or treated as negligible, so that the complementary SCDF may be simplified to $$1 - \hat{S}_p^{\alpha_0}(f) \approx \frac{0.5(1+C)\langle P_S \rangle \cdot \langle P_N \rangle}{\sqrt{\langle P_S^2 \rangle + 3\langle P_S \rangle \cdot \langle P_N \rangle}\sqrt{C^2\langle P_S^2 \rangle + 3C\langle P_S \rangle \cdot \langle P_N \rangle}},$$

so that $$\hat{D}_p^{\alpha_0}(f) \equiv [1 - \hat{S}_p^{\alpha_0}(f)]D(f, \alpha_0) \approx \frac{0.5(1+C)\langle P_S \rangle \cdot \langle P_N \rangle}{C\langle P_S \rangle^2 + (C+1)\langle P_S \rangle \cdot \langle P_N \rangle},$$

This expression may be readily solved for $\langle P_N \rangle$, yielding $$\langle P_N \rangle \approx \frac{2C\hat{D}_p^{\alpha_0}(f)}{1+C-2\hat{D}_p^{\alpha_0}(f)}\langle P_S + P_N \rangle,$$

and subsequently substituted into the equation for the OSNR:

$$OSNR \approx \frac{\sum_i \langle P_S(f_i) + P_N \rangle B_{meas}}{\langle P_S(f_c \pm \alpha_0/2) + P_N \rangle B_{noise}} \cdot \left\{ \frac{1+C}{2C\hat{D}_p^{\alpha_0}(f)} - \frac{1}{C} \right\} - \sum_i \frac{B_{meas}}{B_{noise}}.$$

$$\approx \frac{\sum_i \langle P_S(f_i) + P_N \rangle B_{meas}}{\langle P_S(f - \alpha_0/2) + P_N \rangle B_{noise}} \cdot \frac{1+C}{2C\hat{D}_p^{\alpha_0}(f)} - \sum_i \frac{B_{meas}}{B_{noise}}$$

$$= \frac{\sum_i \left\{ \langle P_S(f_i) + P_N \rangle - \frac{2C\hat{D}_p^{\alpha_0}(f)}{1+C-2\hat{D}_p^{\alpha_0}(f)} \langle P_S(f - \alpha_0/2) + P_N \rangle \right\} B_{meas}}{\frac{2C\hat{D}_p^{\alpha_0}(f)}{1+C}\langle P_S(f - \alpha_0/2) + P_N \rangle B_{noise}}$$

Figure 9:
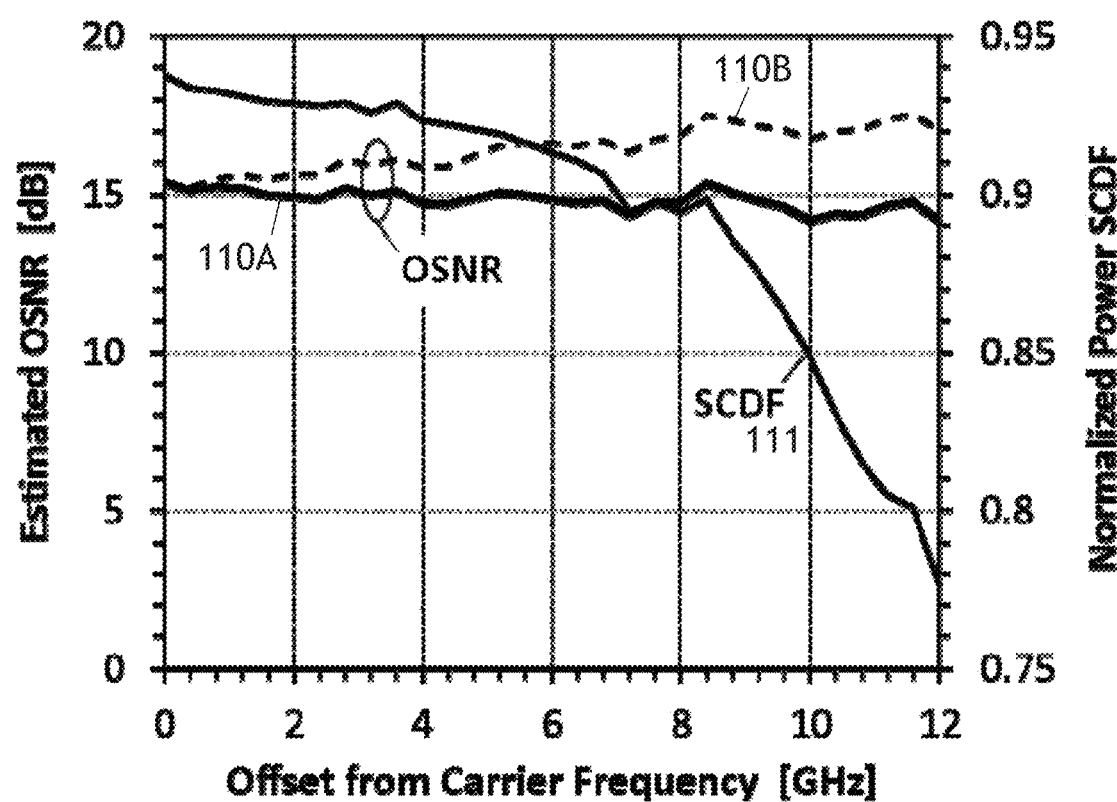
FIG. 9 illustrates a plot of the normalized power SCDF and the estimated OSNR versus frequency offset $f-f_c$ calculated for a 100 Gb/s PM RZ-QPSK signal.

FIG. 9 shows an example of OSNR curves 110A, 110B estimated from a numerically simulated noisy 100 Gb/s PM-QPSK signal having an OSNR of 15 dB. The graph also displays a normalized power SCDF 111 as a function of the frequency offset $f-f_c$. The OSNR 110A has been calculated from the above equation, where C may be calculated directly from the noisy signal spectrum, e.g., $C \approx \langle P_S(f-\alpha_0/2) + P_N \rangle / \langle P_S(f+\alpha_0/2) + P_N \rangle$ (the OSNR 110A may be shown with a bold solid line). It can be seen from this graph that the above approximation slightly underestimates the OSNR at offset frequencies beyond 8 GHz, where the magnitude of the signal power $\langle P_S(f+\alpha_0/2) \rangle$ becomes comparable to that of the noise power $\langle P_N \rangle$, as shown in FIG. 3, so that terms proportional to $\langle P_N \rangle^2$ may not be neglected and the above approximation for the in-band OSNR may no longer be valid. For comparison, the dashed curve 110B in FIG. 9 may display the in-band OSNR calculated from the formula derived for C=1.

Figure 10:
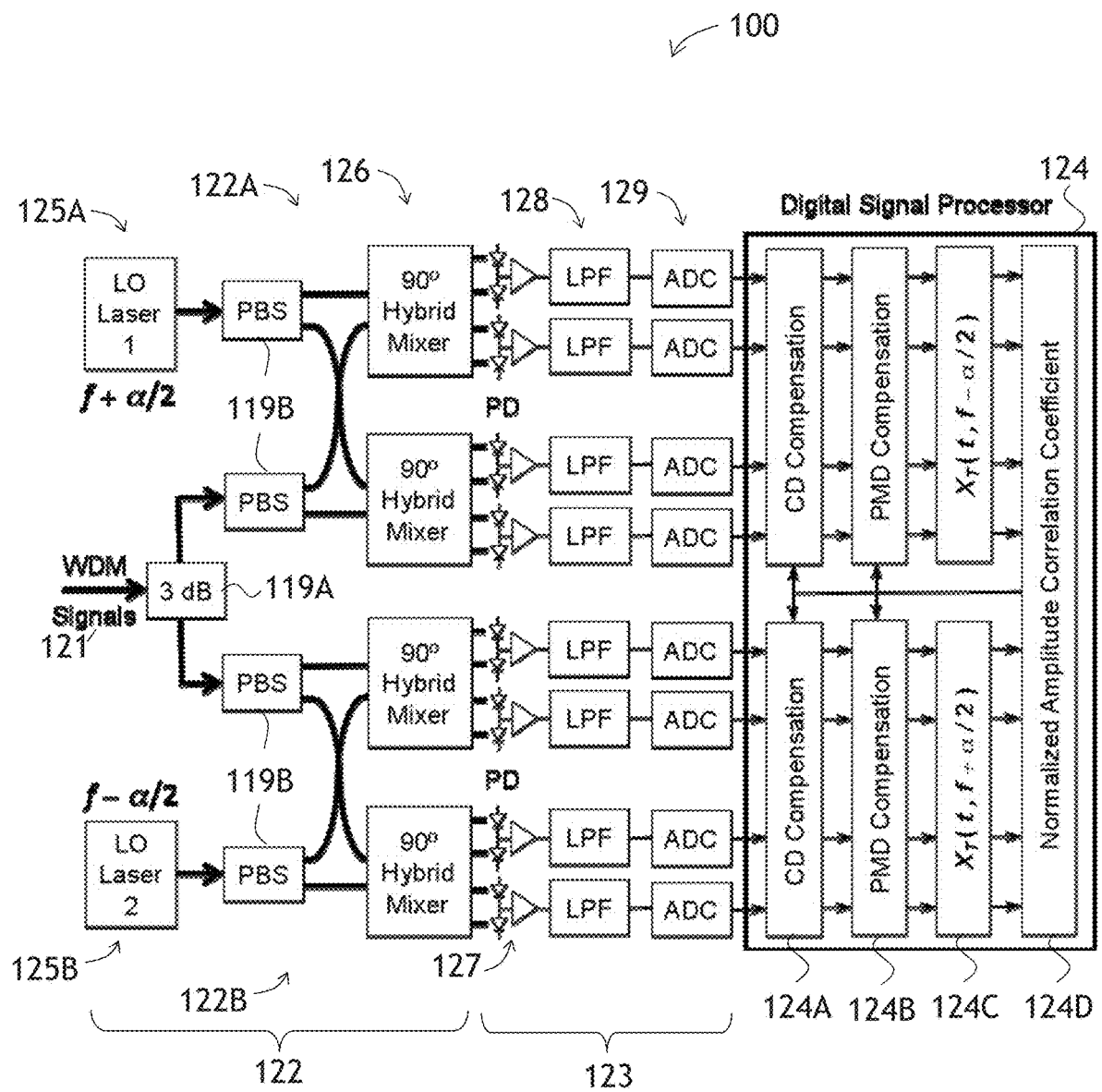
FIG. 10 is a schematic illustration of an apparatus for measuring amplitude correlations in the spectrum of a modulated signal, using two parallel coherent receiver channels with phase and polarization diversity and subsequent digital signal processing.

Amplitudes and phases of the spectral signal components, preferably at optical frequencies $f+\alpha_0/2$ and $f-\alpha_0/2$ as described above, may be detected simultaneously by two parallel coherent optical receivers, each having phase and polarization diversity. With reference to FIG. 10, an exemplary apparatus 100 for determining OSNR of a modulated optical signal 121 may generally include a frequency selective splitter 122, a measuring unit 123, and a digital signal processor (DSP) 124. The modulated optical signal 121 contains a plurality of wavelength channels, e.g. wavelength division multiplexed (WDM) channels, or dense WDM (DWDM) channels, and is normally obtained at a test point along the communication link. An optional spectrum analyzer, not shown, may be used for measuring an optical power spectrum of the modulated optical signal 121. To be useful in the measurement, the optical power spectrum may have at least one of the plurality of wavelength channels.

In an example, the frequency selective splitter 122 may a dual-channel coherent receiver having a tunable local oscillator light source, e.g., a pair of cw tunable lasers ("local oscillators", or LO lasers) 125A and 125B tuned to first and second frequencies, for example $f+\alpha_0/2$ and $f-\alpha_0/2$ respectively. The frequency selective splitter 122 may further include a 3 dB splitter 119A and four polarization beamsplitters (PBS) 119B optically coupled, as shown. The modulated optical signal 121 may be mixed with the corresponding local oscillator laser signals in hybrid mixers 126. The measuring unit 123 may include differential photodetectors 127, low-pass filters (LPFs) 128, and analog-to-digital converters (ADC) 129. Other suitable configurations may be used.

In operation, the frequency selective splitter 122 may select portions of the modulated optical signal 121 at first and second predetermined optical frequencies, in a selected one of the plurality of wavelength channels. The first and second predetermined optical frequencies may be separated by a non-zero frequency interval, e.g. $\alpha_0$ as explained above. To that end, the modulated optical signal 121 may be divided into two identical copies by means of the 3 dB power splitter 119A, which may then be coupled into two substantially identical coherent receiver "channels", e.g., receivers 122A and 122B. Each copy of the modulated signal 121 may be mixed with a highly coherent light from one of the tunable lasers 125A and 125B, outputting a highly coherent continuous-wave optical signal at a predetermined optical frequency. The frequencies of the two local oscillator lasers may be set to be substantially equal to the two frequencies at which the spectral correlation is to be measured, e.g., to $f_1=f+\alpha_0/2$ and $f_2=f-\alpha_0/2$, respectively. The tunable lasers 125A and 125B may also have a narrow linewidth, e.g., no greater than 100 kHz.

Prior to mixing with the output light of the tunable lasers 125A and 125B, each of the two copies of the modulated signal may be decomposed into two signals having mutually orthogonal polarization states by means of the PBS 119B. Furthermore, each of the two orthogonally polarized signals may be further split into two identical copies and then independently mixed with the output light from the tunable LO lasers 125A and 125B, by means of the 90° hybrid mixers 126. The first copy may be mixed with the LO light having an arbitrary optical phase and the second copy with the LO light having an optical phase shifted by 90° relative to the LO light used for the first copy. Such a receiver may be referred to herein as a coherent receiver having polarization and phase diversity.

The measuring unit 123 may measure time-varying optical amplitudes and phases of the first and second portions of the modulated optical signal 121. To that end, the four different mixing products in each of the two coherent receiver channels 122A and 122B may then be detected by balanced photo-detectors 127, which convert the coherently mixed optical amplitudes of the received signal and LO laser into a proportional electrical current, but substantially reject all non-coherently detected signal powers. The four time-varying detector currents $i_k(t)$, k=1, . . . , 4, may be subsequently amplified and filtered by the four identical electrical LPFs 128, before they are converted into digital signals by a set of four high-resolution ADCs 129, and having an effective number of bits (ENOB) of at least 12 and a sampling rate substantially higher than two times the bandwidth of LPFs.

Once the time-varying amplitudes and phases have been measured, the signal processor 124 may determine a correlation between the time-varying amplitudes and phases of the first and second portions of the modulated optical signal, and may calculate the OSNR from the correlation of the time-varying parameters and the power spectrum of the modulated optical signal 121. In an example, this may be done as follows. The four receiver currents $i_1(t,f\pm\alpha/2)$, . . . , $i_4(t,f\pm\alpha/2)$, generated in each of the two coherent receiver channels 122A and 122B, may describe the amplitude, phase, and polarization state of the received optical signal at frequencies $f\pm\alpha/2$. The four currents may be used to form a two-dimensional complex Jones vector that is proportional to the Jones vector of the optical signal, e.g., $$\tilde{X}_T(t, f \pm \alpha/2) = \beta \begin{vmatrix} i_1(t, f \pm \alpha/2) + ji_2(t, f \pm \alpha/2) \\ i_3(t, f \pm \alpha/2) + ji_4(t, f \pm \alpha/2) \end{vmatrix},$$

where β a may be an undetermined proportionality factor and $j=\sqrt{-1}$. Hence, the Jones vectors formed by the four receiver currents in each of the two coherent receivers may be used to calculate the normalized amplitude SCDF. In an example, this may be accomplished in a fast digital signal processor (DSP), which processes the data at the sampling rate of the ADC 129.

Prior to calculating the amplitude SCDF, any undesired differential phase shifts between the two Jones vectors $\tilde{X}_T(t,f-\alpha/2)$ and $\tilde{X}_T(t,f+\alpha/2)$ 124C may be removed (or compensated) by digital signal processing, as described above, including differential phase shifts introduced by CD in the communication systems ("CD compensation") as well as static phase shifts introduced in the receiver. This may be achieved by a CD compensation module 124A. Likewise, any PMD-induced differential polarization transformations between the two Jones vectors may be removed ("PMD compensation"). This may be achieved by a PMD compensation module 124B. This digital CD and PMD compensation may be accomplished iteratively by means of a feedback loop, in which the differential phase shifts and the differential polarization transformations are varied in sufficiently small steps until the amplitude SCDF reaches a maximum. Then, the normalized amplitude correlation coefficient may be computed by a computing module 124D.

Figure 11:
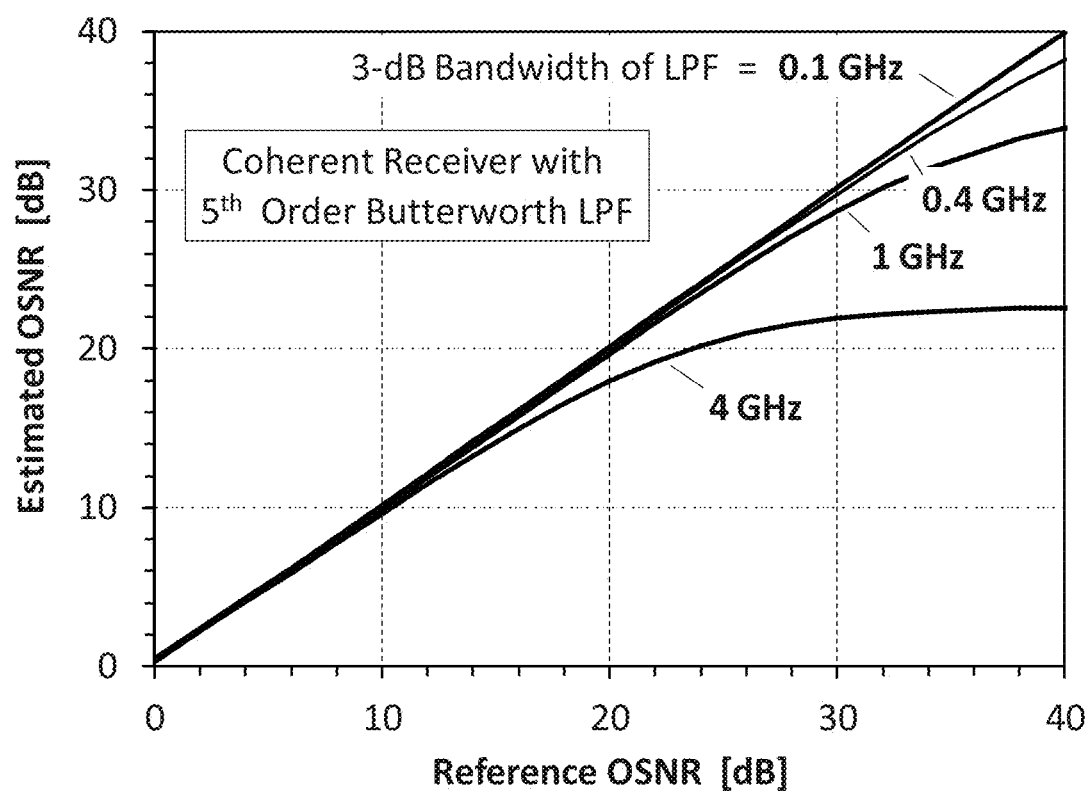
FIG. 11 illustrates a plot of OSNR estimated from amplitude SCDF in a coherently received 100 Gb/s PM RZ-QPSK signal versus reference OSNR, calculated for a receiver with 5th-order Butterworth electric low-pass filter having four different bandwidths.

For in-band OSNR measurements in QPSK and higher-order M-ary QAM signals, the electrical bandwidth of the coherent receiver 122, which may be substantially equal to twice the bandwidth of the LPF 128, may be as small as possible, so that the correlation between the two detected Jones vectors is maximized. On the other hand, the receiver bandwidth may be wide enough so that a sufficiently large electrical signal is available for determining the SCDF. In an example, the 3-dB electrical bandwidth of the LPF 128 may be around 100 MHz for in-band OSNR measurements in 40 Gb/s and 100 Gb/s PM-QPSK signals. FIG. 11 may illustrate effects of the receiver bandwidth on the accuracy of OSNR measurements on a coherently detected 100 Gb/s PM RZ-QPSK signal for the 3 dB bandwidth of the LPF 128 of 0.1 GHz, 0.4 GHz, 1 GHz, and 4 GHz. Severe degradations of the measurement accuracy may be seen at high OSNR values when the receiver bandwidth substantially exceeds 400 MHz. It should be appreciated that the bandwidth requirement for the LPF 128 may scale linearly with the bit-rate of the signal 121.

Figure 12:
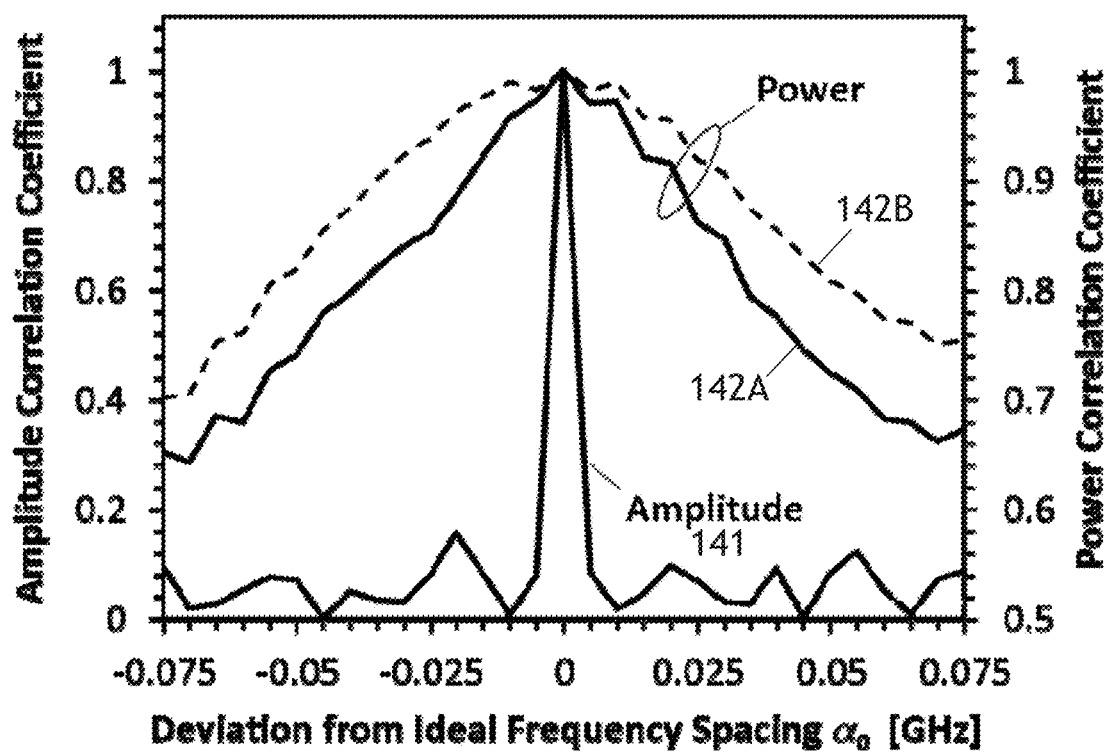
FIG. 12 illustrates a plot of a normalized amplitude and power SCDFs in a 100 Gb/s PM RZ-QPSK signal versus frequency separation of local oscillator (LO) lasers, displayed versus frequency deviation. The solid curves assume an electrical receiver with $5^{th}$-order Butterworth low-pass filter and the dashed curve a receiver with $5^{th}$-order Bessel low-pass filter, both having a 3-dB bandwidth of 40 MHz.

Furthermore, the optical frequencies of the two tunable (LO) lasers 125A and 125B may be precisely adjusted in order to measure maximal correlation between the spectral components of the analyzed optical signal 121. This may be accomplished by first setting one of the two LO lasers (e.g., 125A) to a fixed frequency within the spectral bandwidth of the signal, and by then varying the optical frequency of the other LO laser (e.g., 125B) continuously—or in sufficiently small steps—until the SCDF reaches a maximum. It should be appreciated that a maximal amplitude correlation may be observed over a very narrow optical frequency range, e.g., of less than 1 MHz. FIG. 12 displays a numerical simulation of an amplitude SCDF 141 as a function of the frequency separation of the two LO lasers 125A, 125B (FIG. 10) for the case of a 100 Gb/s PM-QPSK signal. In contrast, maximal power correlation curves 142A, 142B (FIG. 14) may be observed over a frequency range of several MHz, which scales linearly with the electrical bandwidth of the receiver. Consequently, spectral correlation measurements may require LO lasers with high frequency stability and low frequency noise. Typically, LO lasers 125A, 125B having a linewidth of less than 10 kHz may be used for amplitude correlation measurements, whereas LO lasers with a linewidth of less than 100 kHz may be sufficient for power correlation measurements. Solid curves 141, 142A correspond to an electrical receiver with fifth-order Butterworth low-pass filter, and the dashed curve 142B may correspond to a receiver with fifth-order Bessel low-pass filter, both having a 3-dB bandwidth of 40 MHz.

Figure 13:
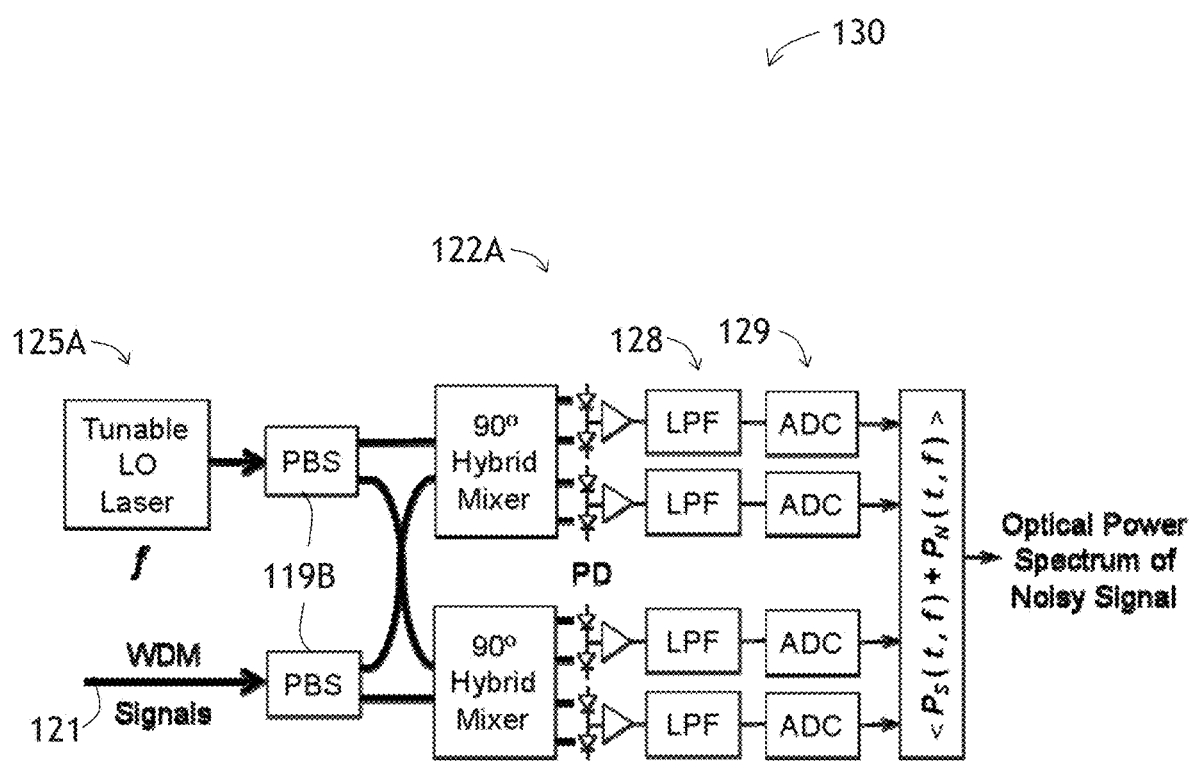
FIG. 13 is a schematic illustration of an apparatus for measuring the optical power spectrum of the noisy signal, using a coherent receiver with continuously tunable LO laser.

The embodiment of FIG. 10 may also be used to measure a power spectrum of the noisy signal (c.f. FIG. 1). This measurement may be illustrated in FIG. 13. In an apparatus 110, one of the two coherent receiver channels 122A, 122B, for example, may be needed e.g. 122A, including elements similar to those described above with reference to FIG. 10. The desired power spectrum may be obtained by scanning the LO laser 125A over the entire bandwidth of the signal 121, while recording the inner product of the Jones vector, i.e. $|X_T(t,f)|^2$, as shown schematically in FIG. 13. Time-varying optical power levels of the first and second portions of the modulated optical signal 121 may be used instead of the time-varying optical amplitudes and phases.

Figure 14:
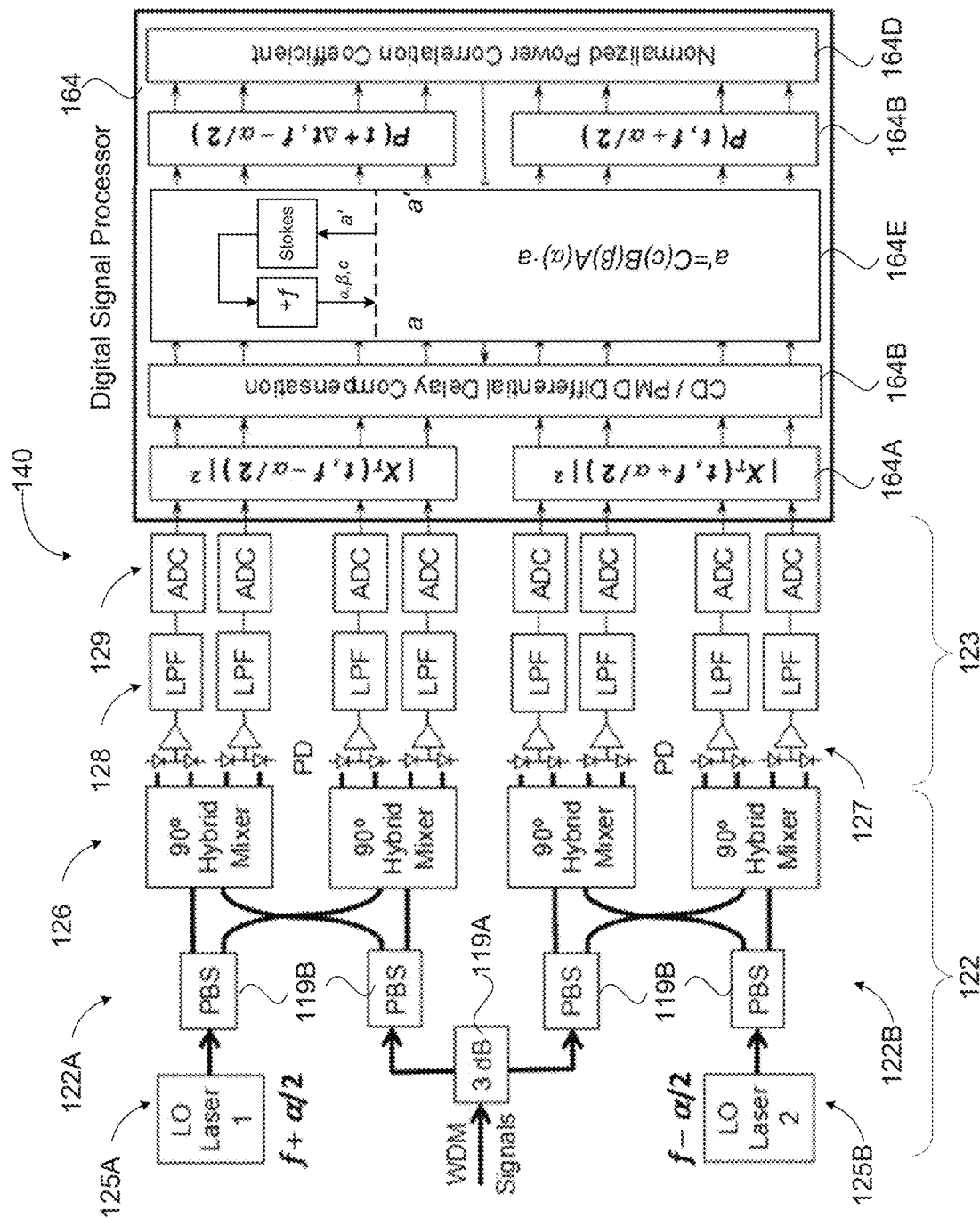
FIG. 14 is a schematic illustration of an apparatus for measuring intensity correlations in the spectrum of a modulated signal, using two parallel coherent receivers with phase and polarization diversity and fast digital signal processing.

FIG. 14 displays a schematic diagram of an apparatus 100 for the above described in-band OSNR measurements using the power SCDF of the optical signal. Similar to the apparatus 100 of FIG. 10, the apparatus 140 of FIG. 14 may have two parallel coherent receiver channels 122A, 122B, which may be connected to a fast DSP 164. One difference may be that the DSP in FIG. 14 may use modules 164C, 164D to calculate the correlation between the time-varying powers of the two Jones vectors 164A, e.g., $$\tilde{P}(t, f \pm \alpha/2) = |\tilde{X}_T(t, f \pm \alpha/2)|^2$$
$$= \beta^2[|i_1(t, f \pm \alpha/2)|^2 + |i_2(t, f \pm \alpha/2)|^2 + |i_3(t, f \pm \alpha/2)|^2 + |i_4(t, f \pm \alpha/2)|^2]$$

The requirements for the electrical bandwidth of the receiver may be similar or identical to those described above for measurements of the amplitude SCDF of FIG. 11.

Prior to calculating the power SCDF, any undesired differential time delays between the two signal powers $\tilde{P}(t, f-\alpha/2)$ and $\tilde{P}(t, f+\alpha/2)$ may need to be removed by digital signal processing, as described above, including delays introduced by CD and PMD as well as those introduced in the receiver. This differential time delay compensation may be accomplished iteratively by means of a feedback loop, in which the delay is varied in sufficiently small steps until the power SCDF reaches a maximum. The differential time delay compensation, for example, may be performed by a module 164B.

Furthermore, the DSP 164 may also provide Jones and/or Stokes computations 164E between 164B and 164C. For example, it should be appreciated that mixer block with LO frequency f−α/2 accordingly may have 4 ADC outputs which may be grouped as vector:

$$\alpha = (\alpha_1, \alpha_2, \alpha_3, \alpha_4)$$

Retarder A may be controllable by parameter α:

$$A = \begin{pmatrix} \cos\alpha & -\sin\alpha & 0 & 0 \\ \sin\alpha & \cos\alpha & 0 & 0 \\ 0 & 0 & \cos\alpha & \sin\alpha \\ 0 & 0 & -\sin\alpha & \cos\alpha \end{pmatrix}$$

Rotator B may be controllable by parameter β:

$$B = \begin{pmatrix} \cos\beta & 0 & \sin\beta & 0 \\ 0 & \cos\beta & 0 & \sin\beta \\ -\sin\beta & 0 & \cos\beta & 0 \\ 0 & -\sin\beta & 0 & \cos\beta \end{pmatrix}$$

Equalizer C may be controllable by parameter c (c being not too far from 0):

$$C = \begin{pmatrix} 1+c & 0 & 0 & 0 \\ 0 & 1+c & 0 & 0 \\ 0 & 0 & 1-c & 0 \\ 0 & 0 & 0 & 1-c \end{pmatrix}$$

In this example, the ADC values a may be multiplied in ADC sample speed into PDL compensated values $\alpha'=(\alpha'_1, \alpha'_2, \alpha'_3, \alpha'_4)$ by equation:

$$\alpha' = C(c) \cdot B(\beta) \cdot A(\alpha) \cdot \alpha$$

Where the parameters α, β, c may be moved slowly by Stokes parameters.

It should be appreciated that Stokes computation may as follows. Control values may be derived from the Stokes Vector $S=(S_0, S_1, S_2, S_3)$, which may be computed from the ADC sample products (e.g., short time) averaged, for averaging some hundred sample products might be appropriate:

$$\begin{pmatrix} \cdot \\ c \\ \beta \\ \alpha \end{pmatrix} \leftarrow S = \begin{pmatrix} S_0 \\ S_1 \\ S_2 \\ S_3 \end{pmatrix} = \begin{pmatrix} \overline{a'^2_1} + \overline{a'^2_2} + \overline{a'^2_3} + \overline{a'^2_4} \\ \overline{a'^2_1} + \overline{a'^2_2} - \overline{a'^2_3} - \overline{a'^2_4} \\ 2\overline{a'_1 a'_3} + 2\overline{a'_2 a'_4} \\ 2\overline{a'_2 a'_3} - 2\overline{a'_1 a'_4} \end{pmatrix}$$

Therefore, to reach a stable ball transformation may be provided with a feedback loop. In other words, for a given PDL distortion, a proportional/integral control loop may be set up which principally may target to reach $(S_1, S_2, S_3) \rightarrow (0, 0, 0)$:

$$c = c + S_1/S_0$$
$$\beta = \beta + S_2/S_0$$
$$\alpha = \alpha + S_3/S_0$$

It should be appreciated that Jones and/or Stokes computations 164E may be implemented independently, as described herein, any number of times. For example, Jones and/or Stokes computations 164E may be implemented independently for each of the two LO Lasers 125A and 125B. Other various examples may also be provided.

Figure 15:
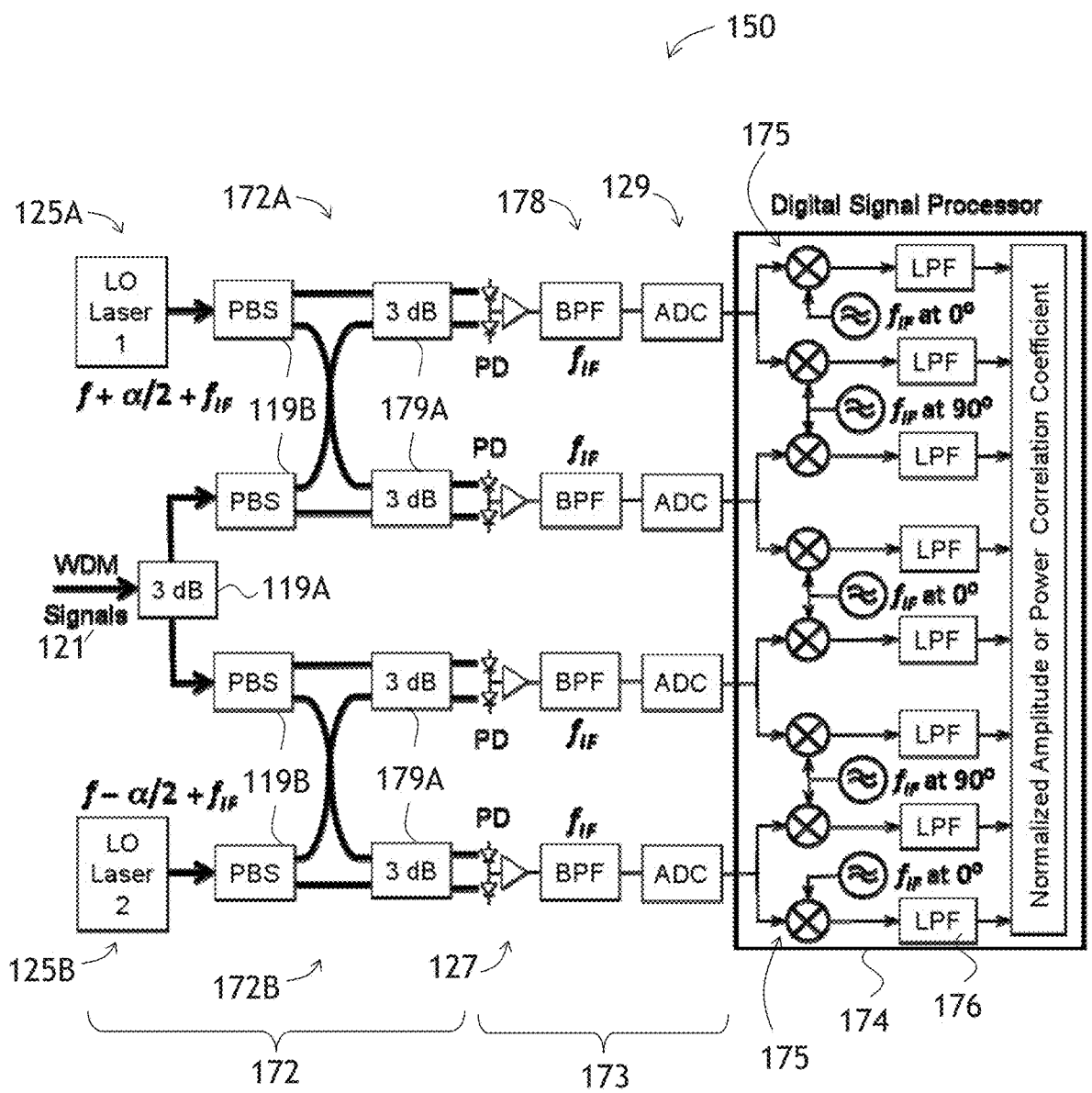
FIG. 15 is a schematic illustration of another apparatus embodiment for measuring amplitude or intensity correlations in the optical spectrum of a modulated signal, using two parallel heterodyne receivers with polarization diversity and digital down-conversion with phase diversity in a digital signal processor.

Turning now to FIG. 15, an apparatus 110 may be used for measuring spectral correlations in power level or amplitude of the signal 121. Similar to apparatus 100 of FIG. 10 and 100 of FIG. 14, the apparatus 110 of FIG. 15 may include a frequency selective splitter 172 including two parallel coherent receivers, or receiver channels 172A, 172B, and a measuring unit 173 to measure correlations between two distinct frequency components of the optical amplitude or power of the signal 121. Unlike the homodyne receivers used in the apparatus 100 of FIG. 10 and 100 of FIG. 14, the apparatus 110 of FIG. 15 may use two heterodyne receivers, in which the frequencies of the two LO lasers 125A and 125B are offset from f−α/2 and f+α/2 by an equal amount $f_{IF}$, which is substantially larger than the bandwidth of the signals from which the amplitude or power SCDF is calculated. As a result, the spectral components to be analyzed may be found at intermediate frequency $f_{IF}$ in the receiver photo currents, which may have been generated by the coherent mixer and, hence, can be selected by means of electrical band-pass filters (BPF) 178 having a pass band centered around $f_{IF}$. Advantageously, such heterodyne receivers do not require coherent mixers with phase diversity, e.g., they do not require 90° hybrid mixers, but instead may use simple 3 dB optical couplers 179A to superimpose the optical signal with the output light of the LO lasers 125A, 125B, yielding two photo currents in each of the two coherent receivers 172A, 172B.

The four signals needed to form the Jones vectors $\tilde{X}_T(t, f\pm\alpha/2)$ in each of the two coherent receivers 172A, 172B may be recovered by down-converting the two bandpass-filtered photocurrents by means of an electrical homodyne receiver to the baseband. Advantageously, this down-conversion and subsequent electrical filtering may be accomplished by digital signal processing in a DSP 174, as shown schematically in FIG. 15, using digital signal mixers 175 and digital low-pass filters 176. However, such digital down-conversion may require that the sampling rate of the ADCs 129 is substantially larger than $2f_{IF}$.

Figure 16:
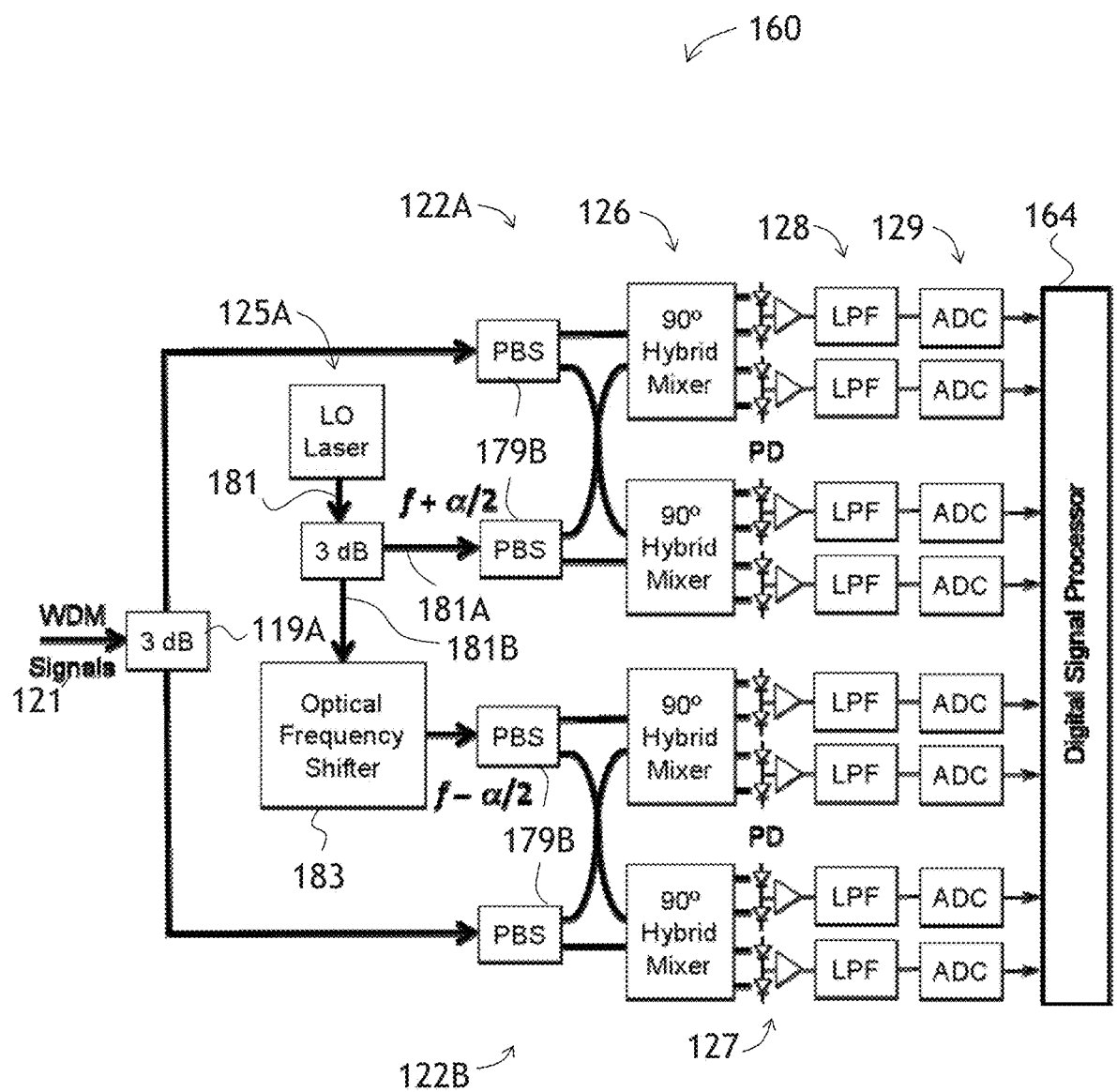
FIG. 16 is a schematic illustration of another apparatus embodiment for measuring amplitude or intensity correlations in the optical spectrum of a modulated signal, using two parallel coherent receivers and a single laser in combination with an optical frequency shifter to generate the two optical local oscillator signals spaced apart in frequency.

In another example, the two independent LO lasers 125A, 125B for the two receivers 172A, 172B may be replaced by a single laser and an optical frequency shifter. Referring now to FIG. 16, an apparatus 100 may be similar to the apparatus 100 of FIG. 14. In the apparatus 100 of FIG. 16, output light 181 of the LO laser 125A may be split (e.g., equally) into two signals 181A and 181B, of which the first signal 181A serves as the LO signal for the first coherent receiver channel 122A, whereas the second signal 181B is shifted in frequency by an amount substantially equal to a by means of an optical frequency shifter 183, to generate a LO optical signal for the second coherent receiver channel 122B.

An advantage of using the single LO laser 125A for both coherent mixer pairs 126 may be that it substantially reduces the frequency stability requirements for the LO laser 125A, provided that optical path lengths for the modulated signal between the 3 dB splitter 119A and the four inputs to the 90° hybrid mixers 126 are substantially equal and, likewise, that the optical path lengths for the two LO signals between the 3 dB splitter 179B and the four inputs to the 90° hybrid mixers 126 are substantially equal. Another advantage of this embodiment may be that the frequency difference between the two LO signals is determined by the frequency offset generated in the optical frequency shifter 183, which may be set with much higher accuracy than the difference frequency of two independent LO lasers 125A and 125B in FIGS. 10 and 14.

Figure 17A:
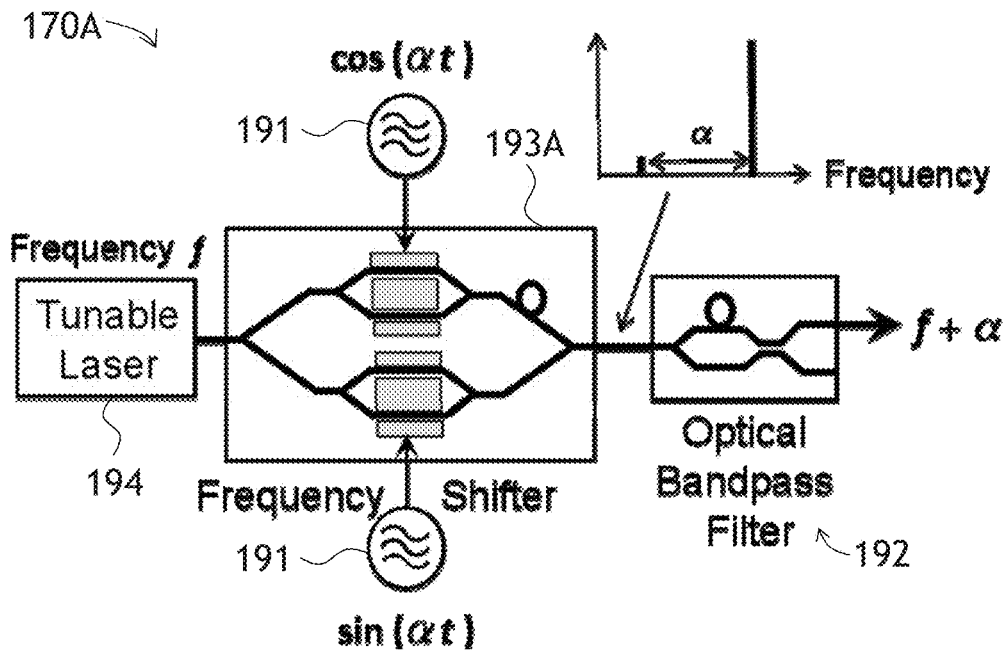
FIGS. 17A-17C are schematic illustrations of three exemplary embodiments of optical frequency shifters for generating one or two frequency shifted optical signals from a single-frequency optical input signal.

Referring to FIG. 17A, an electro-optic frequency shifter 170A has been described in detail by M. Izutsu et al. in "Integrated optical SSB modulator/frequency shifter," *J. Quantum Electron*. Vol. 17, p. 2225 (1981), which is incorporated herein by reference, and will only be briefly described herein. The electro-optic frequency shifter 170A may include an optical modulator 193A coupled to a tunable laser source 194. The frequency offset, or the modulation frequency α may be determined by the electrical frequency of a sinusoidal oscillator 191 outputting two signals of identical frequency that are phase-shifted by 90°. The optical output signal of the frequency shifter 170A may be filtered by an optical band-pass filter 192, as shown in FIG. 17A, to filter out other undesired frequency components, e.g., harmonics of modulation frequency α.

Figure 17B:
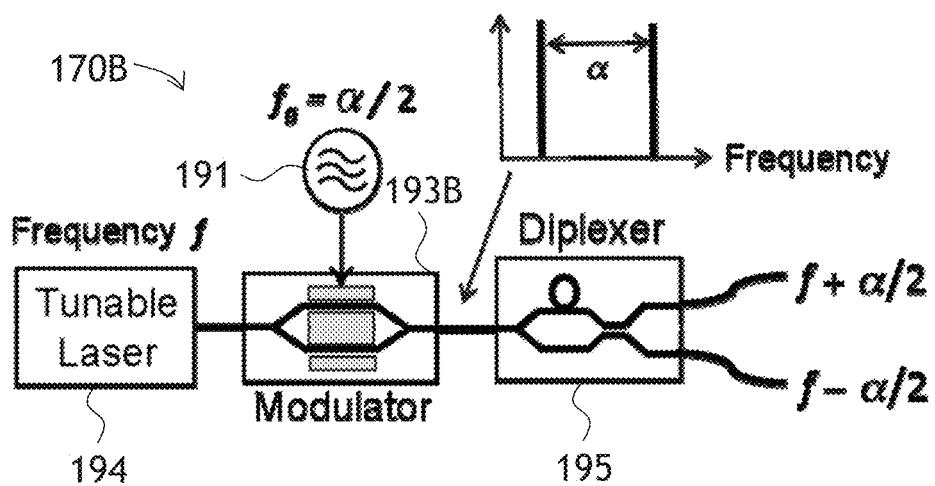
Figure 17C:
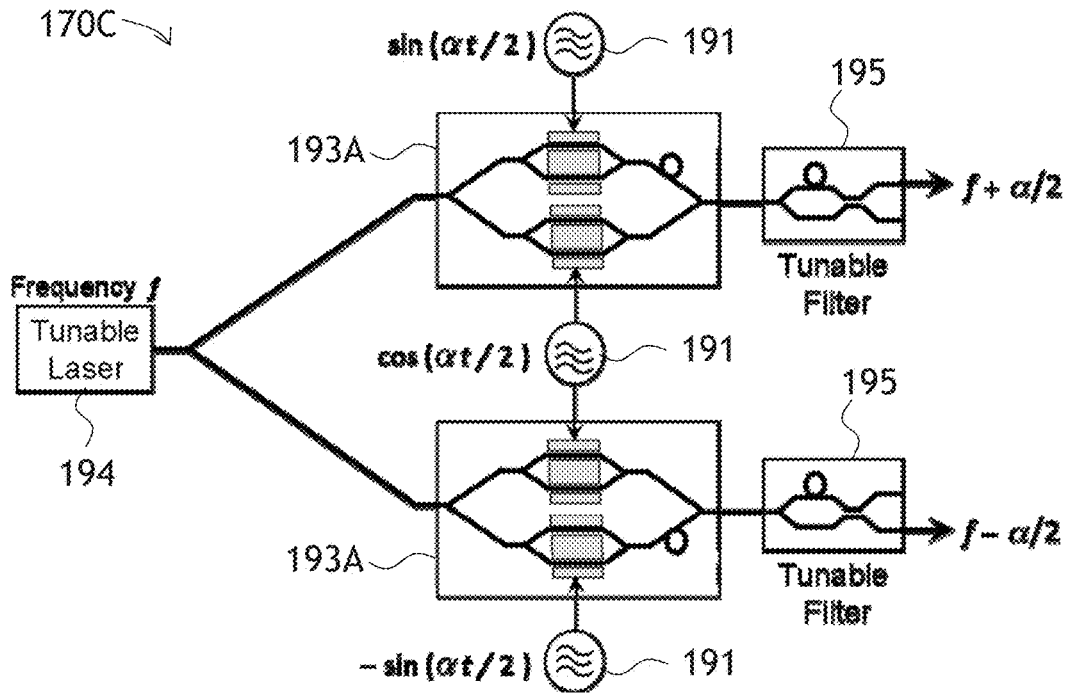

In FIGS. 17B and 17C, electro-optic frequency shifters 170B and 170C may both generate two shifted optical frequency components from a single optical input signal provided by the tunable laser 194. The frequency shifter 170B of FIG. 17B may include a Mach-Zehnder modulator 193B driven by the sinusoidal oscillator 191 with a sinusoidal signal of frequency α/2, and operated in such a way that it generates a carrier-suppressed optical line spectrum, as disclosed by F. Heismann et al. in U.S. Pat. No. 8,135,275 issued Mar. 13, 2012 "Measuring chromatic dispersion in an optical wavelength channel of an optical fiber link", incorporated herein by reference. The two main frequency components in the output of the Mach-Zehnder modulator at frequencies f−α/2 and f+α/2 may be separated from each other and the other undesired frequency components by an optical diplexer 195.

The frequency shifter 170C shown in FIG. 17C may have two identical optical modulators 193A of the kind shown in FIG. 17A and, in general, generates fewer undesired frequency components that the frequency shifter shown in FIG. 17B. However, it may have substantially higher optical insertion loss than the simpler frequency shifter 170B of FIG. 17B.

Figure 18:
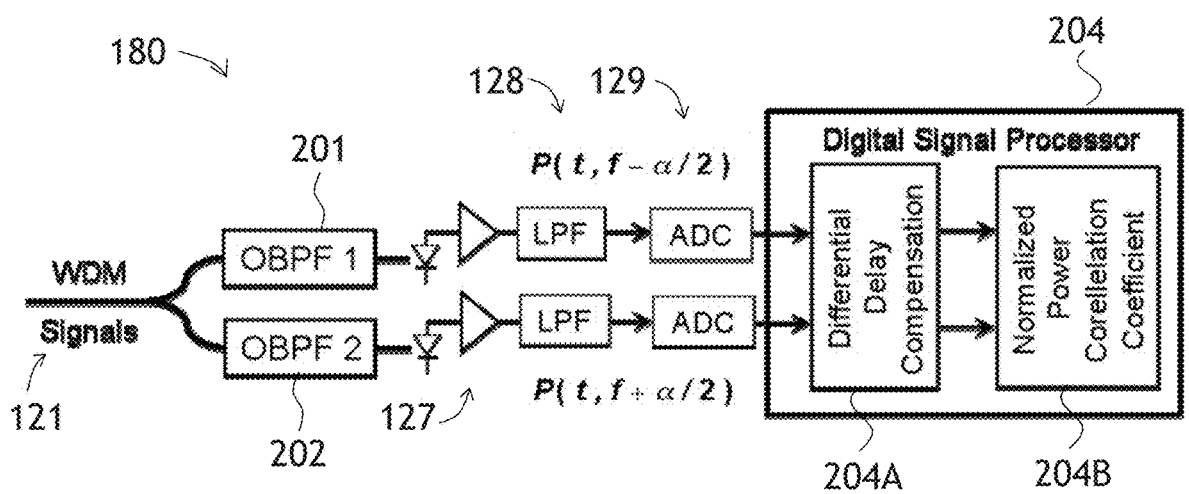
FIG. 18 is a schematic illustration of an apparatus embodiment for measuring intensity correlations in the optical spectrum of a modulated signal using two narrow-band optical band-pass filters and non-coherent photo-receivers.

Turning now to FIG. 18, another embodiment of an apparatus 180 for measuring correlations in the signal's optical power spectrum is shown. The apparatus 180 includes two narrowband optical band-pass filters, 201 (OBPF1) and 202 (OBPF2), for selecting spectral components to be analyzed, two photodetectors 127, two LPFs 128, and two ADCs 129. In operation, optical power levels of the two spectral components filtered by the OBPF1 201 and OBPF2 202, may be detected by the photodetectors 127, filtered by the LPFs 128, and digitized by the ADCs 129. A processing unit 204 may perform differential group delay compensation (module 204A) and then calculates a normalized power correlation coefficient (module 204B).

The apparatus 180 may be substantially simpler than the apparatus 140 of FIG. 14, but the apparatus 180 may require OBPFs with a 3-dB optical bandwidth of less than 1 GHz. Furthermore, the OBPF1 201 and OBPF2 202 may not exhibit significant polarization dependence, such as polarization-dependent loss or polarization-dependent shifts of the optical passband. The techniques described herein do not require foreknowledge of the modulation format and bit-rate of the optical signal, nor is careful calibration of the apparatus with a noiseless signal needed. In addition, techniques described herein may also provide a reliable maximum correlation when polarization-dependent loss (PDL) is present on the fiber link.

Examples to mitigate polarization-dependent loss (PDL) when determining in-band OSNR in signals substantially distorted by chromatic dispersion (CD) or polarization-mode dispersion (PMD) are disclosed herein. In general, because two optical frequencies for noise distributions may consist of two independent noise distributions, originating from the two polarization multiplexed data streams, there may be strong polarization rotation along the fiber. This may result in PDL that is unequal for the two optical frequencies, which in turn may result in unequal distribution in the two optical frequencies. Ultimately, this may cause severe degradation in an OSNR measurement.

Typically, polarization state and the PDL may randomly vary in a 10 Hz cycle region. In order to mitigate PDL in such a situation, it may be helpful to retransform any elliptical polarization, introduced by the transmission line, back to a ball polarization, e.g., in roughly 1 kHz speed, and then subsequently correlating the two optical frequencies. In this case, an integration duration for determining the state of polarization (SOP) may be the correlation time interval, though not necessarily. For each of the two optical frequencies, a transformer may be used. A transformer may consist of Jones matrix multiplications, or other similar calculations, working as retarder, rotator, and/or equalizer. The output of the transformer may feed the correlator. To control the transformer, a Stokes vector of the output may be calculated.

In an example, the Stokes vector or parameter may include the following: S0 sum of power, S1 vertical/horizontal power unbalance, S2 45/−45 degree power unbalance, S3 right/left circular power unbalance. S1, S2, S3 may be signed, and may be suitable to control the retarder, rotator, and/or equalizer. A feedback loop may also be setup to get S1, S2, S3 to zero. It should be appreciated, in some examples, that S1 may control the equalizer, S2 may control the rotator, and S3 may controls the equalizer. In some examples, the Jones matrix computations may be achieved in ADC-sample speed, and the Stokes and feedback loop computations may be achieved for every integration interval. It should be appreciated that these calculations and determinations may be carried out in an FPGA, or other similar hardware or element.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Additionally, one or more of the functions and operations described herein may be performed by a processor, circuit, or other hardware executing machine readable instructions stored in a non-transitory computer readable medium, which may comprise RAM (random access memory), ROM (read only memory), EPROM (erasable, programmable ROM), EEPROM (electrically erasable, programmable ROM), hard drives, flash memory, or other types of storage devices, which may be volatile and/or nonvolatile. It should be appreciated that other hardware components other than what is shown in any of the exemplary figures may also be provided.

As described above, conventional in-band OSNR measurements have been proposed that require foreknowledge of the modulation format and bit-rate of the optical signal, as well as careful calibration of the apparatus with a noiseless signal. In addition, sensitivity to signal distortions introduced by CD and/or PMD may be a problem. Not only do techniques described herein address these and other problems, but a reliable maximum correlation when polarization-dependent loss (PDL) is present on the fiber link may also be provided.

Figure 19:
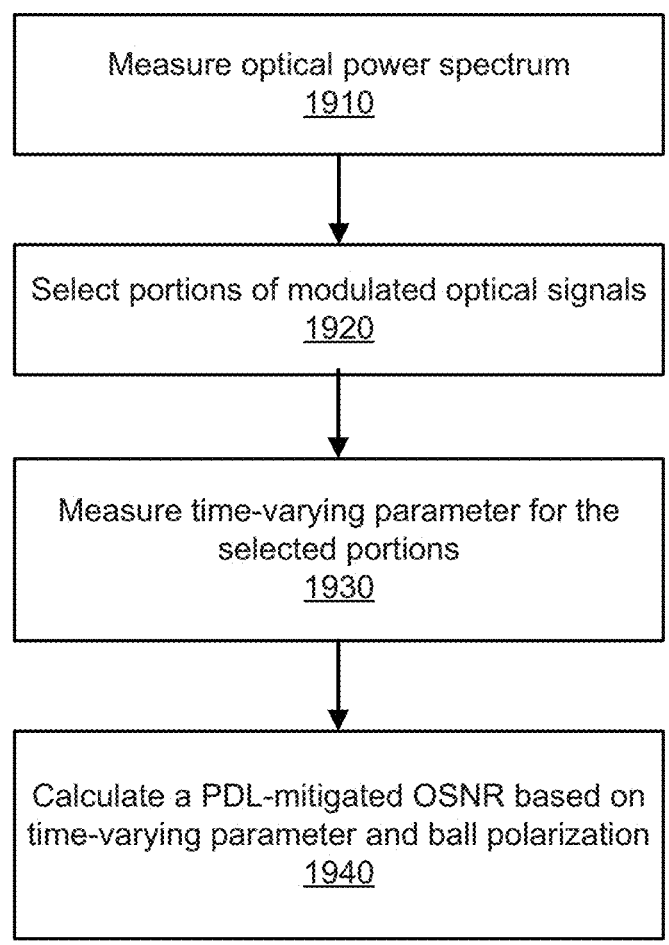
FIG. 19 illustrates a flow chart of a method for mitigating polarization dependent loss (PDL) in an optical signal-to-noise ratio (OSNR) measurement, according to an example.

FIG. 19 illustrates a flow chart of a method for mitigating polarization dependent loss (PDL) in an optical signal-to-noise ratio (OSNR) measurement, according to an example. The method 1900 is provided by way of example, as there may be a variety of ways to carry out the method described herein. The method 1900 may be executed or otherwise performed by one or more processing components as described herein, or by another system or a combination of systems. Each block shown in FIG. 19 may further represent one or more processes, methods, or subroutines, and one or more of the blocks may include machine readable instructions stored on a non-transitory computer readable medium and executed by a processor or other type of processing circuit to perform one or more operations described herein.

At block 1910, an optical power spectrum of a modulated optical signal may be measured. For example, a spectrum analyzer may measure the optical power spectrum, where the optical power spectrum comprises at least one of the plurality of wavelength channels.

At block 1920, portions of modulated optical signals may be selected. For example, a first portion of the modulated optical signal and a second portion of the portions of the modulated optical signal may be selected by a measuring unit. In an example, each of the first and second portions of the optical portions of the modulated optical signals may comprise an independent noise distribution indicative of polarization dependent loss (PDL).

In some examples, the independent noise distribution may be introduced during signal transmission randomly varies in 10 Hz cycles, and transforming any elliptical polarization associated with the independent noise distribution into a ball polarization is in 1 kHz speed.

At block 1930, a time-varying parameter of the first and second portions of the modulated optical signal may be measured. For example, a measuring unit may measure the time-varying parameter for the selected portions.

At block 1940, a signal processor may determine a polarization dependent loss (PDL) mitigated optical signal-to-noise ratio (OSNR). For example, this may be achieved by identifying the independent noise distribution introduced during signal transmission. Furthermore, any elliptical polarization associated with the independent noise distribution may be transformed into a ball polarization.

In some examples, transforming any elliptical polarization associated with the independent noise distribution into a ball polarization may comprise determining a state of polarization (SOP). In some examples, a correlation time interval may be used for an integration duration when determining the state of polarization (SOP).

In some examples, transforming any elliptical polarization associated with the independent noise distribution into a ball polarization may also involve applying Jones matrix multiplications to the first and second portions of the optical portions of the modulated optical signals to yield an output. It may also involve applying Stokes vector calculations to the output. For example, the Stokes vector is applied such that: S0 represents sum of power, S1 represents vertical/horizontal power unbalance, S2 represents 45/−45 degree power unbalance, and S3 represents right/left circular power unbalance. It should be appreciated that this may also include applying a feedback loop to get S1, S2, S3 to zero. In some examples, the Stokes vector and feedback loop may be calculated for every integration interval. In some examples, the Jones matrix multiplications may applied in analog-to-digital converter (ADC) sample speed, and the Stokes vector and feedback loop may be calculated for every integration interval.

In addition, the signal processor may determine a correlation between time-varying parameters of the first and second portions of the modulated optical signal. Moreover, the signal processor may calculate the polarization dependent loss (PDL) mitigated optical signal-to-noise ratio (OSNR) based at least in part on the correlation of the time-varying parameters, the optical power spectrum of the modulated optical signal, and the ball polarization.

It should also be appreciated that the test instrument 200 may also provide other components not shown. For example, middleware (not shown) may be included as well. The middleware may include software hosted by one or more servers or devices. Furthermore, it should be appreciated that some of the middleware or servers may or may not be needed to achieve functionality. Other types of servers, middleware, systems, platforms, and applications not shown may also be provided at the back-end to facilitate the features and functionalities of the testing and measurement system.

Moreover, single components may be provided as multiple components, and vice versa, to perform the functions and features described herein. It should be appreciated that the components of the system described herein may operate in partial or full capacity, or it may be removed entirely. It should also be appreciated that analytics and processing techniques described herein with respect to the test instrument 200, for example, may also be performed partially or in full by other various components of the overall system.

It should be appreciated that the data stores described herein may include volatile and/or nonvolatile data storage that may store data and software or firmware including machine-readable instructions. The software or firmware may include subroutines or applications that perform the functions of the test instrument 200 and/or run one or more application that utilize data from the test instrument 200 or other communicatively coupled system.

The various components, circuits, elements, and interfaces, may be any number of hardware, network, or software components, circuits, elements, and interfaces that serves to facilitate communication, exchange, and analysis data between any number of or combination of equipment, protocol layers, or applications. For example, the interfaces described herein may each include a network interface to communicate with other servers, devices, components or network elements via a network.

Although examples are directed to measuring radio frequency (RF) power in common public radio interface (CPRI) spectrum analysis of a cell site, it should be appreciated that that the test instrument 200 may also use these and other various techniques in to provide interference analysis, signal analysis, and/or other related RF measurements. Ultimately, the systems and methods described herein may minimize cell towner climbs and improve safety, reduce number of testing devices, increase accuracy and reliability, and significantly reduce maintenance and operation expenses.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. An apparatus for mitigating polarization dependent loss (PDL) in an optical signal-to-noise ratio (OSNR) measurement of a modulated optical signal, the apparatus comprising:
  a spectrum analyzer to measure an optical power spectrum of a modulated optical signal, wherein the optical power spectrum comprises at least one of a plurality of wavelength channels; and
  a measuring unit to:
    select a first portion of the modulated optical signal and a second portion of the modulated optical signal, wherein each of the first and second portions of the modulated optical signal comprises from predetermined and separated optical frequencies and of independent polarization dependent loss (PDL); and
    measure a time-varying parameter of the first and second portions of the modulated optical signal;
  a signal processor to mitigate polarization dependent loss (PDL) in an optical signal-to-noise ratio (OSNR) by:
    transforming any elliptical polarization associated with independent noise distribution into a ball polarization;
    determining a correlation between time-varying parameters of the first and second portions of the modulated optical signal; and
    calculating a polarization dependent loss (PDL) mitigated optical signal-to-noise ratio (OSNR) based on the correlation between the time-varying parameters, the optical power spectrum of the modulated optical signal, and the ball polarization.

2. The apparatus of claim 1, wherein the PDL introduced during signal transmission randomly varies in 10 Hz cycles, and transforms any elliptical polarization into a ball polarization in 1 kHz speed.

3. The apparatus of claim 1, wherein transforming any elliptical polarization associated with the independent noise distribution into a ball polarization comprises determining a state of polarization (SOP).

4. The apparatus of claim 3, wherein a correlation time interval is used for an integration duration when determining the state of polarization (SOP).

5. The apparatus of claim 1, wherein transforming any elliptical polarization associated with the independent noise distribution into a ball polarization comprises:
  applying Jones matrix multiplications to the first and second portions of the modulated optical signal to yield an output;
  applying Stokes vector calculations to the output, such that:
    S0 represents sum of power,
    S1 represents vertical/horizontal power unbalance,
    S2 represents 45/−45 degree power unbalance, and
    S3 represents right/left circular power unbalance; and
  applying a feedback loop to get S1, S2, S3 to zero, wherein the Stokes vector calculations and feedback loop are calculated for every integration interval.

6. The apparatus of claim 5, wherein the Jones matrix multiplications are applied in analog-to-digital converter (ADC) sample speed, and wherein the Stokes vector calculations and feedback loop are calculated for every integration interval.

7. A method mitigating polarization dependent loss (PDL) in an optical signal-to-noise ratio (OSNR) measurement of a modulated optical signal, the method comprising:
  measuring an optical power spectrum of a modulated optical signal, wherein the optical power spectrum comprises at least one of a plurality of wavelength channels;
  selecting a first portion of the modulated optical signal and a second portion of the modulated optical signal, wherein each of the first and second portions of the modulated optical signal comprises an independent noise distribution indicative of polarization dependent loss (PDL);
  measuring a time-varying parameter of the first and second portions of the modulated optical signal;
  determining a polarization dependent loss (PDL) mitigated optical signal-to-noise ratio (OSNR) by:
    transforming any elliptical polarization associated with the independent noise distribution into a ball polarization;
    determining a correlation between time-varying parameters of the first and second portions of the modulated optical signal; and
    calculating the polarization dependent loss (PDL) mitigated optical signal-to-noise ratio (OSNR) based on the correlation between the time-varying parameters, the optical power spectrum of the modulated optical signal, and the ball polarization.

8. The method of claim 7, wherein the independent noise distribution introduced during signal transmission randomly varies in 10 Hz cycles, and transforming any elliptical polarization associated with the independent noise distribution into a ball polarization is in 1 kHz speed.

9. The method of claim 7, wherein transforming any elliptical polarization associated with the independent noise distribution into a ball polarization comprises determining a state of polarization (SOP).

10. The method of claim 9, wherein a correlation time interval is used for an integration duration when determining the state of polarization (SOP).

11. The method of claim 7, wherein transforming any elliptical polarization associated with the independent noise distribution into a ball polarization comprises:
 applying Jones matrix multiplications to the first and second portions of the modulated optical signal to yield an output; and
 applying Stokes vector calculations to the output.

12. The method of claim 11, wherein:
 the Stokes vector is applied such that:
  S0 represents sum of power,
  S1 represents vertical/horizontal power unbalance,
  S2 represents 45/−45 degree power unbalance, and
  S3 represents right/left circular power unbalance; and
 applying a feedback loop to get S1, S2, S3 to zero, wherein the Stokes vector calculations and feedback loop are calculated for every integration interval.

13. The method of claim 12, wherein the Jones matrix multiplications are applied in analog-to-digital converter (ADC) sample speed.

14. The method of claim 12, wherein the Stokes vector calculations and feedback loop are calculated for every integration interval.

15. A non-transitory computer-readable storage medium having an executable stored thereon, which when executed instructs a processor to perform the method of claim 7.

16. A method for determining a polarization dependent loss (PDL) mitigated optical signal-to-noise ratio (OSNR) of a modulated optical signal, the method comprising:
 measuring an optical power spectrum of a modulated optical signal, wherein the optical power spectrum comprises at least one of a plurality of wavelength channels;
 transforming any elliptical polarization associated with independent noise distribution into a ball polarization in 1 kHz speed;
 determining a correlation between time-varying parameters of first and second portions of the modulated optical signal; and
 calculating the polarization dependent loss (PDL) mitigated optical signal-to-noise ratio (OSNR) based on the correlation between the time-varying parameters, the optical power spectrum of the modulated optical signal, and the ball polarization.

17. The method of claim 16, wherein transforming any elliptical polarization associated with the independent noise distribution into a ball polarization comprises determining a state of polarization (SOP), and wherein a correlation time interval is used for an integration duration when determining the state of polarization (SOP).

18. The method of claim 16, wherein transforming any elliptical polarization associated with the independent noise distribution into a ball polarization comprises:
 applying Jones matrix multiplications to the first and second portions of the modulated optical signal to yield an output; and
 applying Stokes vector calculations to the output such that:
  S0 represents sum of power,
  S1 represents vertical/horizontal power unbalance,
  S2 represents 45/−45 degree power unbalance, and
  S3 represents right/left circular power unbalance; and
 applying a feedback loop to get S1, S2, S3 to zero, wherein the Stokes vector calculations and feedback loop are calculated for every integration interval.

19. The method of claim 18, wherein the Jones matrix multiplications are applied in analog-to-digital converter (ADC) sample speed, and wherein the Stokes vector calculations and feedback loop are calculated for every integration interval.

20. A non-transitory computer-readable storage medium having an executable stored thereon, which when executed instructs a processor to perform the method of claim 16.

\* \* \* \* \*